US012736395B2

(12) United States Patent
Gerdes et al.

(10) Patent No.: US 12,736,395 B2
(45) Date of Patent: Sep. 15, 2026

(54) ACOUSTIC DETECTION OF DISGUISED VEHICLES

(71) Applicant: ORACLE INTERNATIONAL CORPORATION, Redwood Shores, CA (US)

(72) Inventors: Matthew T. Gerdes, Oakland, CA (US); Guang C. Wang, San Diego, CA (US); Timothy D. Cline, Gainesville, VA (US); Kenny C. Gross, Escondido, CA (US)

(73) Assignee: Oracle International Corporation, Redwood Shores, CA (US)

( * ) Notice: Subject to any disclaimer, the term of this patent is extended or adjusted under 35 U.S.C. 154(b) by 236 days.

(21) Appl. No.: 18/103,774

(22) Filed: Jan. 31, 2023

(65) Prior Publication Data

US 2023/0358598 A1 Nov. 9, 2023

Related U.S. Application Data

(63) Continuation-in-part of application No. 17/735,245, filed on May 3, 2022, now Pat. No. 12,158,548.

(51) Int. Cl.
*G01H 3/08* (2006.01)
*G06F 3/0482* (2013.01)
(Continued)

(52) U.S. Cl.
CPC ............. *G01H 3/08* (2013.01); *G06F 3/0484* (2013.01); *H04R 1/406* (2013.01); *H04R 3/005* (2013.01); *G06F 3/0482* (2013.01)

(58) Field of Classification Search
None
See application file for complete search history.

(56) References Cited

U.S. PATENT DOCUMENTS 3,705,516 A 12/1972 Reis
4,635,058 A 1/1987 Sutphin, Jr.
(Continued)

FOREIGN PATENT DOCUMENTS

CN 107181543 A1 9/2017
CN 110941020 A1 3/2020
(Continued)

OTHER PUBLICATIONS

Pietila, Glenn, Gabriella Cerrato, and Robert E. Smith. "Detection and identification of acoustic signatures." Proc. 2011 NDIA Ground Vehicle Systems Engineering and Technology Symposium. 2011. (Year: 2011).*

(Continued)

*Primary Examiner* — Jonathan D Armstrong
(74) *Attorney, Agent, or Firm* — Kraguljac Law Group LLC

(57) ABSTRACT

Systems, methods, and other embodiments associated with acoustic detection of disguised vehicles are described. In one embodiment of a method for acoustic detection of disguised vehicles, a first acoustic output of a target vehicle that appears to be of a first type is recorded. A second acoustic output of a reference vehicle that is known to be of the first type is retrieved. It is acoustically detected that the target vehicle is not of the first type based at least on an acoustic dissimilarity between the first acoustic output and the second acoustic output. An electronic alert is then generated that the target vehicle is of a second type that is disguised as the first type based on the acoustic dissimilarity.

17 Claims, 8 Drawing Sheets

(51) Int. Cl.
*G06F 3/0484* (2022.01)
*H04R 1/40* (2006.01)
*H04R 3/00* (2006.01)

(56) References Cited

U.S. PATENT DOCUMENTS 4,686,655 A 8/1987 Hyatt
5,357,484 A 10/1994 Bates et al.
5,619,616 A 4/1997 Brady et al.
7,020,802 B2 3/2006 Gross et al.
7,071,841 B2 7/2006 Haynes
7,191,096 B1 3/2007 Gross et al.
7,281,112 B1 10/2007 Gross et al.
7,292,659 B1 11/2007 Gross et al.
7,391,835 B1 6/2008 Gross et al.
7,542,995 B2 6/2009 Thampy et al.
7,573,952 B1 8/2009 Thampy et al.
7,613,576 B2 11/2009 Gross et al.
7,613,580 B2 11/2009 Gross et al.
7,702,485 B2 4/2010 Gross et al.
7,869,977 B2 1/2011 Lewis et al.
8,055,594 B2 11/2011 Dhanekula et al.
8,069,490 B2 11/2011 Gross et al.
8,111,174 B2 * 2/2012 Berger .................. G08G 1/015 340/933
8,150,655 B2 4/2012 Dhanekula et al.
8,164,484 B2 * 4/2012 Berger .................. G08G 1/015 701/119
8,200,991 B2 6/2012 Vaidyanathan et al.
8,214,682 B2 7/2012 Vaidyanathan et al.
8,275,738 B2 9/2012 Gross et al.
8,341,759 B2 12/2012 Gross et al.
8,365,003 B2 1/2013 Gross et al.
8,452,586 B2 5/2013 Master et al.
8,457,913 B2 6/2013 Zwinger et al.
8,543,346 B2 9/2013 Gross et al.
8,983,677 B2 3/2015 Wright et al.
9,093,120 B2 7/2015 Bilobrov
9,514,213 B2 12/2016 Wood et al.
9,911,336 B2 3/2018 Schlechter et al.
9,933,338 B2 4/2018 Noda et al.
10,015,139 B2 7/2018 Gross et al.
10,149,169 B1 12/2018 Keller
10,403,141 B2 * 9/2019 Patil ........................ G01S 11/14
10,452,510 B2 10/2019 Gross et al.
10,496,084 B2 12/2019 Li et al.
10,860,011 B2 12/2020 Gross et al.
10,929,776 B2 2/2021 Gross et al.
11,042,428 B2 6/2021 Gross et al.
11,055,396 B2 7/2021 Gross et al.
11,255,894 B2 2/2022 Wetherbee et al.
11,377,111 B1 7/2022 Guziec
11,392,786 B2 7/2022 Gross et al.
11,408,988 B2 8/2022 Brabant
11,686,756 B2 6/2023 Wetherbee
2001/0044719 A1 11/2001 Casey
2003/0033094 A1 2/2003 Huang
2003/0061008 A1 3/2003 Smith et al.
2004/0258154 A1 12/2004 Liu et al.
2005/0219042 A1 10/2005 Thompson
2006/0037400 A1 2/2006 Haynes
2006/0155399 A1 * 7/2006 Ward ...................... G06F 16/68 704/E11.002
2006/0181413 A1 8/2006 Mostov
2007/0190368 A1 * 8/2007 Jung ......................... F41H 3/00 709/224
2007/0195646 A1 * 8/2007 Govindswamy ........ G01S 15/89 367/88
2007/0288242 A1 12/2007 Spengler et al.
2008/0140362 A1 6/2008 Gross et al.
2008/0252309 A1 10/2008 Gross et al.
2008/0252441 A1 10/2008 McElfresh et al.
2008/0256398 A1 10/2008 Gross et al.
2008/0277196 A1 * 11/2008 Rapp ...................... G01V 1/133 422/187
2009/0099830 A1 4/2009 Gross et al.
2009/0115635 A1 * 5/2009 Berger .................... G10L 25/51 340/943
2009/0125467 A1 5/2009 Dhanekula et al.
2009/0306920 A1 12/2009 Zwinger et al.
2010/0023282 A1 1/2010 Lewis et al.
2010/0033386 A1 2/2010 Lewis et al.
2010/0080086 A1 4/2010 Wright
2010/0161525 A1 6/2010 Gross et al.
2010/0305892 A1 12/2010 Gross et al.
2010/0306165 A1 12/2010 Gross et al.
2011/0169664 A1 * 7/2011 Berger .................. G08G 1/015 340/943
2012/0030775 A1 2/2012 Gross et al.
2012/0245978 A1 9/2012 Jain et al.
2013/0042262 A1 * 2/2013 Riethmueller ... H04N 21/25866 725/14
2013/0154829 A1 6/2013 Mostov
2013/0157683 A1 6/2013 Lymberopoulos et al.
2013/0211662 A1 8/2013 Blumer et al.
2015/0137830 A1 5/2015 Keller, III et al.
2016/0021435 A1 * 1/2016 Topchy ................. G08C 23/02 340/870.3
2016/0098561 A1 4/2016 Keller et al.
2016/0258378 A1 9/2016 Bizub et al.
2017/0163669 A1 6/2017 Brown et al.
2018/0011130 A1 1/2018 Aguayo Gonzalez et al.
2018/0053413 A1 * 2/2018 Patil ..................... G08G 1/0965
2018/0349797 A1 12/2018 Garvey et al.
2018/0358033 A1 * 12/2018 Yu ......................... G06F 16/686
2019/0041842 A1 2/2019 Cella et al.
2019/0064034 A1 2/2019 Fayfield et al.
2019/0102718 A1 4/2019 Agrawal
2019/0163719 A1 5/2019 Gross et al.
2019/0196892 A1 6/2019 Matei et al.
2019/0197145 A1 6/2019 Gross et al.
2019/0233185 A1 * 8/2019 Strong .................... G10K 1/00
2019/0237997 A1 8/2019 Tsujii et al.
2019/0243799 A1 8/2019 Gross et al.
2019/0286725 A1 9/2019 Gawlick et al.
2019/0324430 A1 10/2019 Herzog et al.
2019/0378022 A1 12/2019 Wang et al.
2020/0096624 A1 3/2020 Brabant
2020/0125819 A1 4/2020 Gross et al.
2020/0144204 A1 5/2020 Keller, III et al.
2020/0201950 A1 6/2020 Wang et al.
2021/0081573 A1 3/2021 Gross et al.
2021/0103747 A1 * 4/2021 Moustafa ............... G06F 18/25
2021/0158202 A1 5/2021 Backlawski et al.
2021/0174248 A1 6/2021 Wetherbee et al.
2021/0270884 A1 9/2021 Wetherbee et al.
2021/0406374 A1 12/2021 Wang et al.
2022/0092343 A1 * 3/2022 Jakobsen ............... G06F 18/22
2022/0121955 A1 4/2022 Chavoshi et al.
2023/0159037 A1 5/2023 Guziec

FOREIGN PATENT DOCUMENTS

WO 2009046359 A2 4/2009
WO 2020215116 A1 10/2020

OTHER PUBLICATIONS

Sciabica, Jean-François, et al. "Dissimilarity test modelling by time-frequency representation applied to engine sound." Audio Engineering Society Conference: 45th International Conference: Applications of Time-Frequency Processing in Audio. Audio Engineering Society, 2012. (Year: 2012).*

Tafazzoli, Faezeh, Hichem Frigui, and Keishin Nishiyama. "A large and diverse dataset for improved vehicle make and model recognition." Proceedings of the IEEE conference on computer vision and pattern recognition workshops. 2017. (Year: 2017).*

Zhu, Wenqian, et al. "Tell the truth from the front: Anti-disguise vehicle re-identification." 2020 IEEE International Conference on Multimedia and Expo (ICME). IEEE Computer Society, 2020. (Year: 2020).*

(56) References Cited

OTHER PUBLICATIONS

De Groot, T. H. "Localization and classification using an acoustic sensor network." Ph. D. dissertation (2010). (Year: 2010).*
U.S. Patent and Trademark Office (USPTO), US Office Action in co-pending U.S. Appl. No. 17/735,245, filed May 3, 2022 having a date of mailing of May 18, 2023 (13 pgs.).
Petros Maragos, Morphological Correlation and Mean Absolute Error Criteria, Division of Applied Sciences, Harvard University, Cambridge, MA, downloaded on May 3, 2023 from IEEE Xplore; pp. 1-4.
Patent Cooperation Treaty (PCT), International Search Report and Written Opinion issued in PCT International Application No. PCT/US2021/015802 having a date of mailing of May 28, 2021 (13 pgs).
Patent Cooperation Treaty (PCT), International Search Report and Written Opinion issued in PCT International Application No. PCT/US2021/013633 having a date of mailing of May 6, 2021 (10 pgs).
Huang H, et al. "Electronic counterfeit detection based on the measurement of electromagnetic fingerprint," Microelectronics Reliability: an Internat . Journal & World Abstracting Service, vol. 55, No. 9, Jul. 9, 2015 (Jul. 9, 2015) pp. 2050-2054.
Bouali Fatma et al. "Visual mining of time series using a tubular visualization," Visual Computer, Springer, Berlin, DE, vol. 32, No. 1, Dec. 5, 2014 (Dec. 5, 2014), pp. 15-30.
Patent Cooperation Treaty (PCT), International Search Report and Written Opinion issued in PCT International Application No. PCT/US2021/014106 having a date of mailing of Apr. 26, 2021 (9 pgs).
Patent Cooperation Treaty (PCT), International Search Report and Written Opinion issued in PCT International Application No. PCT/US2021/015359 having a date of mailing of Apr. 9, 2021 (34 pgs).
Dickey et al.; Checking for Autocorrelation in Regression Residuals; pp. 959-965; Proceedings of 11th Annual SAS Users Group International Conference; 1986.
Hoyer et al.; Spectral Decomposition and Reconstruction of Nuclear Plant Signals; pp. 1153-1158; published Jan. 1, 2005; downloaded on Jul. 14, 2021 from: https://support.sas.com/resources/papers/proceedings-archive/SUGI93/Sugi-93-193%20Hoyer%20Gross.pdf.
Guo, Yuhua, "Implementation of 3d Kiviat Diagrams." (2008). (Year: 2008).
Wang, Ray C., et al., Process Fault Detection Using Time-Explicit Kiviat Diagrams. AlChE Journal 61.12 (2015): 4277-4293.
US Patent and Trademark Office, "Non-Final Office Action", issued in U.S. Appl. No. 16/804,531 having a date of mailing of Jul. 20, 2021(22 pgs).
Whisnant et al.; "Proactive Fault Monitoring in Enterprise Servers," IEEE—International Multiconference in Computer Science & Computer Engineering (Jun. 27-30, 2005) 11 pgs.
US Nuclear Regulatory Commission; "Technical Review of On-Line Monitoring Techniques for Performance Assessment," vol. 1, Jan. 31, 2006.
Gribok, et al,. "Use of Kernel Based Techniques for Sensor Validation in Nuclear Power Plants," International Topical Meeting on Nuclear Plant Instrumentation, Controls, and Human-Machine Interface Technologies (NPIC & HMIT 2000), Washington, DC, Nov. 2000, pp. 1-15.
Singer, et al., "Model-Based Nuclear Power Plant Monitoring and Fault Detection: Theoretical Foundations," Intelligent System Application to Power Systems (ISAP '97), Jul. 6-10, 1997, Seoul, Korea pp. 60-65.
Wald, A, "Sequential Probability Ratio Test for Reliability Demonstration", John Wiley & Sons, 1947.
U.S. Patent and Trademark Office (USPTO), US Office Action in co-pending U.S. Appl. No. 17/735,245, filed May 3, 2022 having a date of mailing of Jan. 19, 2024 (18 pgs.).
Kenny Gross, Oracle Labs; MSET2 Overview: "Anomaly Detection and Prediction" Oracle Cloud Autonomous Prognostics; p. 1-58; Aug. 8, 2019.
Gross, K. C. et al., "Application of a Model-Based Fault Detection System to Nuclear Plant Signals," downloaded from https://www.researchgate.net/publication/236463759; Conference Paper: May 1, 1997, 5 pages.
U.S. Patent and Trademark Office (USPTO), US Office Action in co-pending U.S. Appl. No. 17/735,245, filed May 3, 2022 having a date of mailing of Oct. 4, 2023 (22 pgs.).
Seyerlehner, Klaus et al., "Frame Level Audio Similarity—A Codebook Approach", Proc. of the 11th Int. Conference on Digital Audio Effects (DAFx-08), Espoo, Finland, Sep. 1-4, 2008 (8 pgs).
Casey, et al.; "Audio Shingling for Measuring Musical Similarity", Purdue University—Engineering 2006 pp. 1-8.
Yesilli et al.: "On Transfer Learning for Chatter Detection in Turning using Wavelet Packet Transform and Ensemble Empirical Mode Decomposition", CIRP Journal of Manufacturing Science and Technology, Elsevier, Amsterdam, NL, vol. 28, Dec. 30, 2019 (Dec. 30, 2019), pp. 118-135.
Abebe Diro et al.; A Comprehensive Study of Anomaly Detection Schemes in IoT Networks Using Machine Learning Algorithms; pp. 1-13; 2021; downloaded from: https://doi.org/10.3390/s21248320.
Zhenlong Xiao, et al.; Anomalous IoT Sensor Data Detection: An Efficient Approach Enabled by Nonlinear Frequency-Domain Graph Analysis; IEEE Internet of Things Journal, Aug. 2020; pp. 1-11.
Choi Kukjin et al.: "Deep Learning for Anomaly Detection in Time-Series Data: Review, Analysis, and Guidelines", IEEE Access, IEEE, USA, vol. 9, Aug. 26, 2021, (23 pgs).
Gross Kenny et al: "AIDecision Support Prognostics for IoT Asset Health Monitoring, Failure Prediction, Time to Failure", 2019 International Conference on Computational Science and Computational Intelligence (CSCI), IEEE, Dec. 5, 2019, pp. 244-248.
Abran et al., "Estimation models based on functional profiles," Intl. Workshop on Software Measurement—IWSM/MetriKon, Kronisburg (Germany) Shaker Verlag. 2004 (Year: 2004).
Paulraj, et al; "Moving Vehicle Recognition and Classification Based on Time Domain Approach", Malaysian Technical Universities Conference on Engineering & Technology, MUCET 2012, Part 1—Electronic and Electrical Engineering, Procedia Engineering 53, pp. 405-410 (https:\\www.sciencedirect.com).
US Patent and Trademark Office, "Non-Final Office Action", issued in U.S. Appl. No. 18/098,277 having a date of mailing of Dec. 20, 2024 (18 pgs).
Kolgankar, Amar: "Correlation of Acoustic Emission Parameters with Weight and Velocity of moving Vehicles", (2005) 90 pgs.
Bowie, Jeanne M.: "Development of a Weigh-in-Motion System using Acoustic Emission Sensors", (2011) 146 pgs.

* cited by examiner

ACOUSTIC DETECTION OF DISGUISED VEHICLES

CROSS REFERENCE TO RELATED APPLICATIONS

This disclosure is a continuation-in-part of U.S. patent application Ser. No. 17/735,245 filed May 3, 2022, titled "ACOUSTIC FINGERPRINTING", having inventors: Matthew T. GERDES, Guang C. WANG, Timothy D. CLINE, and Kenny C. GROSS, and assigned to the present assignee, the entirety of which is incorporated herein by reference.

BACKGROUND

Criminal organizations modify boats, automobiles, and other vehicles to smuggle illicit cargo or persons in a manner that preserves a stock, unmodified appearance of the vehicles. It is not practicable, and may violate individual rights, to have human personnel arbitrarily search apparently unmodified vehicles for illicit cargo or persons. There may be benefits to using technology to identify vehicles that have hidden characteristics or properties not immediately visible to an observer.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
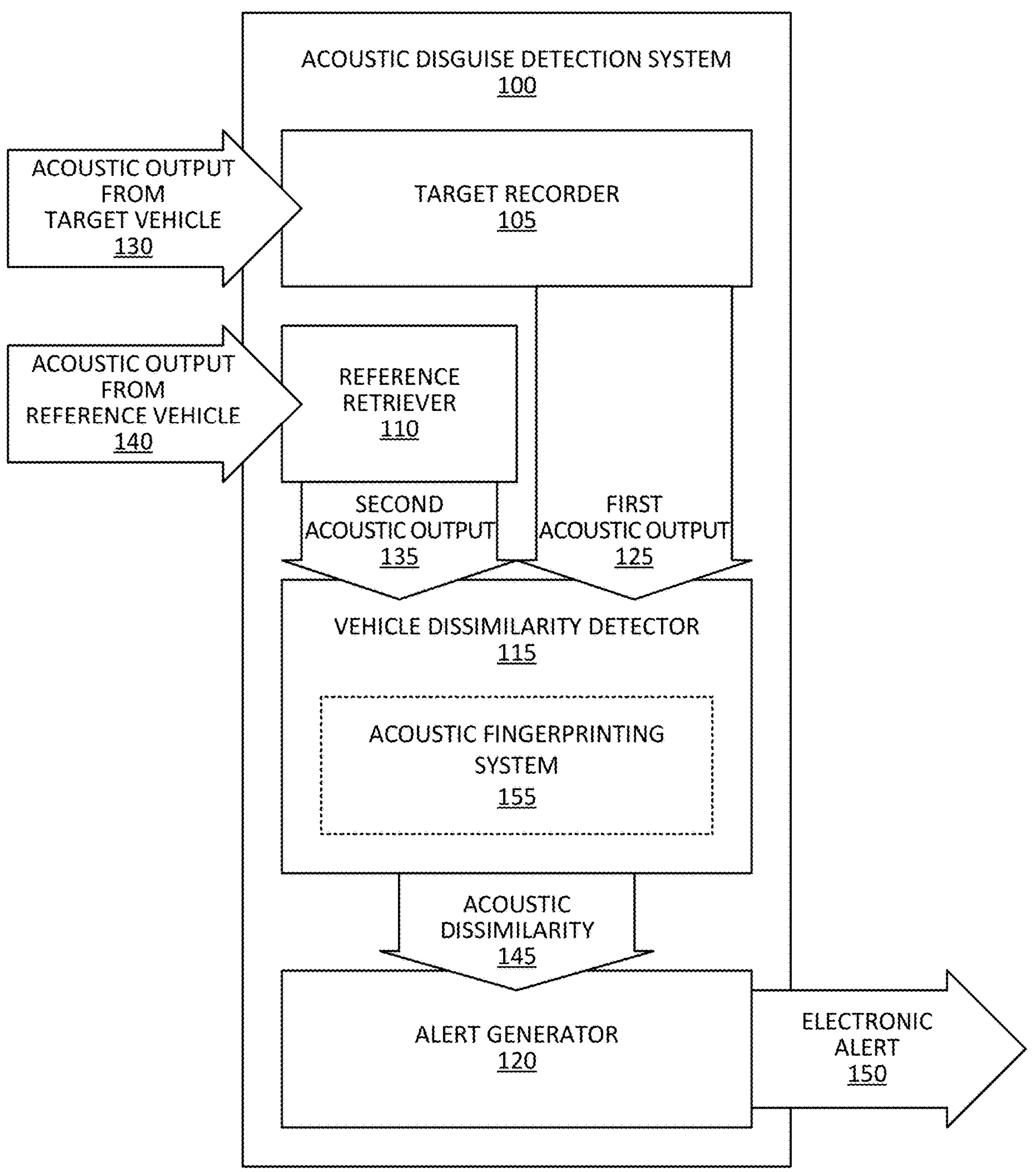
FIG. 1 illustrates one embodiment of an acoustic disguise detection system associated with acoustic detection of vehicles that are modified to carry illicit cargo while disguised to appear unmodified.

Systems, methods, and other embodiments are described herein that provide for determining whether a vehicle is of a particular type (e.g., make, model and year) that the vehicle appears to be based on sounds that the vehicle produces. For example, a vehicle of a given make and model makes a particular sound due to engine noise and vibrations of frame, body, hull, or other components. Hidden changes to the configuration or components of the vehicle will change the sound produced by the vehicle. For example, vehicles that are modified to carry illicit cargo while disguised to appear unmodified may be detected using acoustics emitted by the vehicle. In one embodiment, an acoustic disguise detection system compares acoustic output of a vehicle with a reference of acoustic output for the type of the vehicle to acoustically detect that the vehicle produces acoustic output that is dissimilar from its type. Dissimilarity of acoustic output between a vehicle and the type of the vehicle where the modification is not visibly apparent indicates that the modifications are concealed.

Such acoustic detection of disguised vehicles is highly useful, for example, in surveillance and interdiction of vehicles such as boats that are used for smuggling or other illicit activities. For example, drug cartels and other criminal enterprises may modify boats below the waterline to provide concealed cargo spaces for illegal cargos such as drugs, weapons, cash, or persons. Or, for example, a criminal enterprise may replace engines of vehicles to increase speed of the vehicle beyond what would be expected from visual inspection of the vehicle. In one embodiment, acoustic disguise detection system can identify both vehicles with concealed cargo spaces, and vehicles with concealed speed capabilities. A boat with engines that have been replaced generates different sounds from the original unmodified boat. And, a boat moving additional cargo space generates different sounds from an unmodified boat.

Use of radar or lasers for surveillance of a target vehicle has a disadvantage of being active surveillance that involves directing detectable energy at the target vehicle, alerting operators of the target vehicle to the surveillance. Advantageously, in one embodiment, acoustic detection of disguised vehicles is passive, collecting sound wave vibrations emitted by operation of the target vehicle without directing energy at the target vehicle, as discussed in further detail herein.

In one embodiment, the acoustic disguise detection system compares the acoustic (sound) output given off by a target vehicle that appears to be of a particular type with the acoustic output of a reference vehicle for the type. Should the acoustic outputs differ significantly, the acoustic disguise detection system has acoustically detected that the target vehicle may be masquerading as an unmodified vehicle of the type, while being in actuality modified to perform illicit activities. Alerts indicating the detection of such disguised vehicles may be provided, for example to single out the disguised vehicle for additional surveillance. Thus, in one embodiment, the acoustic disguise detection system enables detection of concealed modifications to vehicles using undetectable, passive surveillance, thereby significantly improving the technology of surveillance. The acoustic disguise detection system enables detection of acoustic dissimilarity of vehicles (which may indicate hidden properties or characteristics of vehicles) using acoustic output from the vehicles, thereby significantly improving the technology of surveillance.

It should be understood that no action or function described or claimed herein is performed by the human mind, and cannot be practically performed in the human mind. An interpretation that any action or function described or claimed herein can be performed in the human mind is inconsistent with and contrary to this disclosure.

Definitions

As used herein, the term "time series" refers to a data structure in which a series of data points (such as observations or sampled values) are indexed in time order. In one embodiment, the data points of a time series may be indexed with an index such as a time stamp and/or an observation number. As used herein, the terms "time series signal" and "time series" are synonymous.

As used herein, the term "vector" refers to a data structure that includes a set of data points (such as observations or sampled values) from multiple time series at one particular index such as a time stamp and/or observations number.

As used herein, the term "time series database" refers to a data structure that includes one or more time series that share an index (such as a series of time stamps, positions, or observation numbers) in common. As an example, time series may be considered "columns" of a time series database, and vectors may be considered "rows" of a time series database.

As used herein, the term "residual" refers to a difference between a value (such as a measured, observed, sampled, or resampled value) and an estimate, reference, or prediction of what the value is expected to be. For example, a residual may be defined by a difference between an ML estimate for a value and an actual, observed value. In one embodiment, the residual is a positive or negative value. In another embodiment, the residual is an absolute value or magnitude. In one embodiment, a time series of residuals or "residual time series" refers to a time series made up of residual values between a time series of values and a time series of what the values are expected to be.

As used herein, the term "vehicle" refers to a self-propelled device for transporting persons or things. A vehicle may be, for example, a watercraft for transporting persons or things on or in water, such as a boat, ship, submarine, submersible, personal watercraft or jet-ski, or hovercraft. A vehicle may also be, for example, an aircraft for transporting persons or things by air, such as an airplane, helicopter, multi-copter (for example a quadcopter), autogyro or gyrocopter, ultralight, blimp, dirigible, or semi-rigid airship. A vehicle may also be, for example, a land craft for transporting persons or things over land, such as an automobile, a truck, a locomotive or train, a tank, or other motor vehicle for traveling over solid or semi-solid surfaces. In one embodiment, the test vehicle is a watercraft or an aircraft. In one embodiment, vehicles may be piloted or controlled by an operator on board the vehicle. In one embodiment, vehicles may be remotely operated or remote controlled by an operator away from the vehicle, such as in a drone aircraft. Vehicles may be autonomous or self-driving, where the operator is computer logic. Vehicles may be non-autonomous, where the operator is a person.

In one embodiment, as used herein, the term "disguised" or "disguise" in reference to a vehicle means to have an appearance of or give an initial impression of the vehicle being of a first type in order to conceal that the vehicle is, in fact, of a second type. A vehicle that is disguised as a first type is constructed or configured so as to conceal, obscure, or misrepresent to an observer that the vehicle is of the first type, and/or is not of the second type. For example, a boat may be disguised as being of a first type, such as an unmodified instance of a given make and model of boat, while in actuality being of a second type, such as an instance of the given make and model of boat that has been modified for example by addition of hull volume below the waterline, or by addition of more powerful engines. Or, for another example, a car may appear to be a Honda Accord (first type), and the car has been modified with more powerful engines (a second type), the car is thus disguised as a Honda Accord. The disguise may be detected acoustically because the modified car emits different sounds than an unmodified Honda Accord. The initial impression of the first type may be from a distance, for example, a distance from which one or more acoustic transducers used to record the first acoustic output are operated. Additional detail regarding the meaning of the term "disguise" is provided elsewhere herein, for example in the discussion of process block 225 of acoustic disguise detection method 200 under the heading "Example Method—Alert Generation".

As used herein, the term "type" in reference to a vehicle refers to a specific configuration of a vehicle. For example, a vehicle of a given make and model that is in a stock, unmodified configuration is an instance of a first type of vehicle. Additional stock, unmodified vehicles of the given make and model are additional instances of the first type of vehicle. Instances of the first type of vehicle appear to be of the first type to an observer. And, for example, a vehicle of the given make and model that has a structural or drive train configuration that has been modified away from the stock, unmodified configuration is an instance of a second type of vehicle that differs from the first type of vehicle. Thus, modification or alteration of the structure (e.g., hull) or drive train (e.g., engine) or other characteristics of a vehicle changes the type of vehicle. Note, modification or alteration of the structure (e.g., hull) or drive train (e.g., engine) of a vehicle changes the acoustic properties (i.e., sounds) of the vehicle with reference to the acoustic properties of the unmodified vehicle, for example, during operation of the vehicle when the engines are running.

—Example Acoustic Disguise Detection System—

FIG. 1 illustrates one embodiment of an acoustic disguise detection system 100 associated with acoustic detection of vehicles that are modified to carry illicit cargo while disguised to appear unmodified. Acoustic disguise detection system 100 includes components for acoustically monitoring a vehicle for the presence of concealed modifications. Components of acoustic disguise detection system 100 may include a target recorder 105, a reference retriever 110, a vehicle dissimilarity detector 115, and an alert generator 120. In one embodiment each of these components 105, 110, 115, and 120 of acoustic disguise detection system 100 may be implemented as software executed by computer hardware. For example, components 105, 110, 115, and 120 may be implemented as one or more intercommunicating software modules, routines, or services for performing the functions of the components described herein.

Target recorder 105 is configured to record a first acoustic output 125 of a target vehicle that appears to be of a first type. In one embodiment, target recorder 105 is configured to receive acoustic output from a target vehicle 130 and to write acoustic output from a target vehicle 130 as first acoustic output 125 into storage or memory for subsequent processing. Reference retriever 110 is configured to retrieve a second acoustic output 135 of a reference vehicle that is known to be of the first type. In one embodiment, reference retriever 110 requests and receives (for example, from an acoustic fingerprint library) acoustic output from a reference vehicle 140, and to write acoustic output from a reference vehicle 140 as second acoustic output 135 into storage or memory for subsequent processing.

Vehicle dissimilarity detector 115 is configured to acoustically detect that the target vehicle is not of the first type based at least on an acoustic dissimilarity 145 between the first acoustic output 125 and the second acoustic output 135. In one embodiment, vehicle dissimilarity detector 115 writes acoustic dissimilarity 145 to storage or memory for subsequent processing. Alert generator 120 is configured to generate an electronic alert 150 that the target vehicle is of a second type that is disguised as the first type based on the acoustic dissimilarity 145.

In one embodiment, vehicle dissimilarity detector 115 includes acoustic fingerprinting system 155. In one embodiment, acoustic fingerprinting system 155 is configured to generate acoustic fingerprints based on one or more of first acoustic output 125 and second acoustic output 135. In one embodiment, acoustic fingerprinting system 155 is configured to generate a similarity metric that quantifies similarity of a target acoustic fingerprint (generated for the target vehicle from first acoustic output 125) and a reference acoustic fingerprint (generated for the reference vehicle from second acoustic output 135). In one embodiment, acoustic fingerprinting system 155 is configured to compare the similarity metric to a threshold that determines whether or not the target and reference vehicles are so acoustically dissimilar as not to be a match for each other. In one embodiment, failure of the target vehicle to match the reference vehicle indicates that the target vehicle is disguised as the first type while in actuality being of the second type. In one embodiment, acoustic fingerprinting system 155 is configured to indicate whether or not the target vehicle matches the reference vehicle.

Further details regarding acoustic disguise detection system 100 are presented herein. In one embodiment, the operation of acoustic disguise detection system 100 will be described with reference to example acoustic disguise detection method 200 shown in FIG. 2. In one embodiment, acoustic fingerprinting for acoustically determining whether or not a vehicle is disguised will be described with reference to example acoustic fingerprinting system 155 shown in FIG. 3, an example acoustic fingerprinting methods 400 and 600 shown in FIGS. 4 and 6, respectively, and an example spectrogram 500 shown in FIG. 5. An example graphical user interface for viewing electronic alerts of acoustic detection of disguised vehicles will be described with reference to FIG. 7.

—Example Acoustic Disguise Detection Method—

Figure 2:
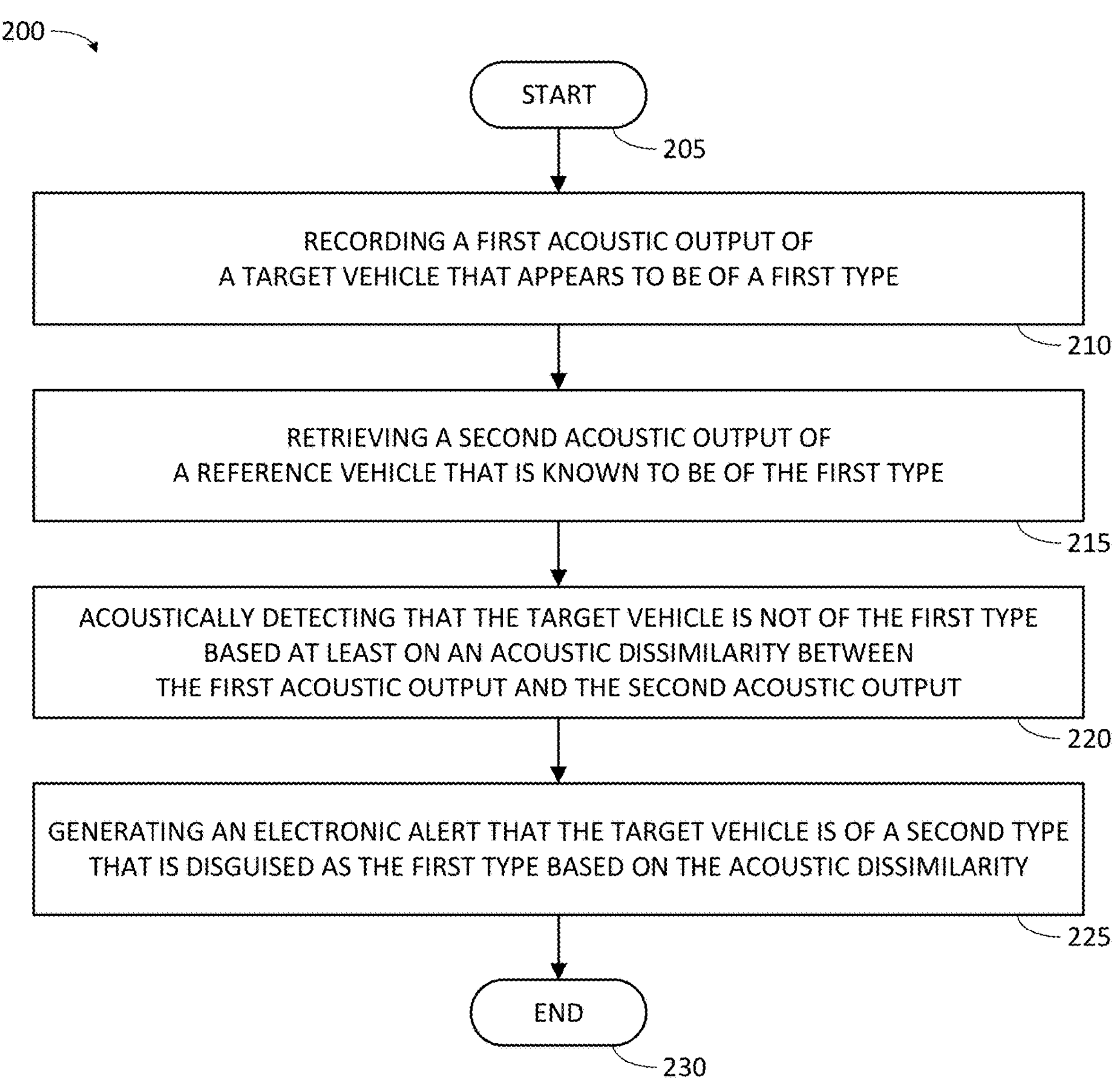
FIG. 2 illustrates one embodiment of an acoustic disguise detection method associated with acoustic detection of vehicles that are modified to carry illicit cargo while disguised to appear unmodified.

FIG. 2 illustrates one embodiment of an acoustic disguise detection method 200 associated with acoustic detection of vehicles that are modified to carry illicit cargo while disguised to appear unmodified. As an overview, in one embodiment, acoustic disguise detection method 200 records a first acoustic output of a target vehicle that appears to be of a first type and retrieves a second acoustic output of a reference vehicle that is known to be of the first type. Then, acoustic disguise detection method 200 acoustically detects that the target vehicle is not of the first type based at least on an acoustic dissimilarity between the first acoustic output and the second acoustic output. In response to the detection that the target vehicle is not of the first type, acoustic disguise detection method 200 generates an electronic alert that the target vehicle is of a second type that is disguised as the first type based on the acoustic dissimilarity. In this way, in one embodiment, acoustic disguise detection method 200 detects the presence of hidden characteristics or properties of a vehicle that are not immediately visible to an observer.

In one embodiment, acoustic disguise detection method 200 initiates at START block 205 in response to an acoustic disguise detection system determining one or more of (i) that an acoustic disguise detection system has received or has begun receiving acoustic output of a target vehicle; (ii) that an instruction to perform acoustic disguise detection method 200 on acoustic output of a vehicle has been received (iii) a user or administrator of acoustic disguise detection system 100 has initiated acoustic disguise detection method 200; (iv) it is currently a time at which acoustic disguise detection method 200 is scheduled to be run (for example, to process a batch of surveillance); or (v) that acoustic disguise detection method 200 should commence in response to occurrence of some other condition. In one embodiment, a computer configured by computer-executable instructions to execute functions of acoustic disguise detection system 100 executes acoustic disguise detection method 200. Following initiation at start block 205, acoustic disguise detection method 200 continues to process block 210.

—Example Method—Recording Target Acoustic Output—

At process block 210, acoustic disguise detection method 200 records acoustic output of a target vehicle that appears to be of a first type of vehicle. For convenience, the acoustic output of the target vehicle may be referred to herein as "first acoustic output" or "target acoustic output". A vehicle that is under acoustic surveillance in order to determine its status as being of a first vehicle type or being disguised as (and not of) the first vehicle type may be referred to herein as a target vehicle or a unit under test (UUT). In one embodiment, the acoustic disguise detection method 200 collects sound produced by powered operation of the target vehicle (the first or target acoustic output), and stores the collected sound for later reference and comparison. The target acoustic output that is recorded from the target vehicle may be used to determine whether the target vehicle is of the first vehicle type as the target vehicle appears to be, or of a second type that is disguised to appear to be of the first vehicle type.

In one example, the target vehicle is a mechanical system that is provided with power for operation using one or more engines or motors. During powered operation, the engines or motors emit (or cause the vehicle to emit) acoustic output. When the engines or motors are not running, the vehicle is unpowered. The acoustic output may be dynamic or changing in intensity, or vary as to frequency of repetition, based on speed of operation of the engine or motor. The acoustic output of a vehicle is sounds produced by powered operation of the vehicle. During powered operation, engines, motors, drive shafts, and other components emit (or cause the vehicle to emit) acoustic output. The acoustic output of the vehicle includes sounds that are influenced by the configuration of the vehicle. In particular, various structural and/or power train configurations of the vehicle affect the acoustic output of the vehicle. Thus, sound—in particular, engine noise (and/or drivetrain noise)—produced by the powered operation of the vehicle carries information about the configuration of the vehicle.

The acoustic output (sound) of a vehicle is vibrations that travel through a physical medium such as air, water, or earth. The acoustic output of a vehicle may be detected, sensed, measured, scanned, or otherwise received by acoustic transducers such as directional microphones. In one embodiment, the received acoustic output covers a spectrum of frequencies detectable by the acoustic transducers. In one embodiment, the spectrum of frequencies approximately covers the range of human hearing, for example from 20 Hz to 20,000 Hz. In one embodiment, the spectrum of frequencies may extend below the range of human hearing into infrasound frequencies. In one embodiment, the spectrum of frequencies may extend above the range of human hearing into ultrasound frequencies.

In one embodiment, the acoustic output of a vehicle that is received by acoustic transducers may be characterized by a spectrum analyzer. The spectrum analyzer takes the electronic signals from the acoustic transducers sensing the acoustic output and converts the electronic signals into a computer-readable representation of the acoustic output. The acoustic output is characterized or represented over the spectrum of frequencies by amplitude values at a fine frequency resolution pre-selected for the spectrum analyzer. For example, the fine-grain frequencies are subdivisions of an audio spectrum at a finest or native resolution available from the spectrum analyzer. The computer-readable representation of the acoustic output is stored for subsequent analysis. In one embodiment, the computer-readable representation of the acoustic output is stored as a time series of sets of amplitude values for each individual fine frequency in the spectrum of frequencies. The time series may be stored by writing it to memory or storage. Thus, in one embodiment, acoustic disguise detection method 200 collects engine noise that is produced by operation of an engine of the target vehicle, and stores the engine noise, for example as one or more time series.

Thus, in one embodiment, acoustic output of the target vehicle may be recorded during a period of acoustic surveillance during which the acoustic output is collected by acoustic transducers. The period of acoustic surveillance may extend over an amount of time sufficient to collect target acoustic output that is representative of the operation of the target vehicle. For example, the target vehicle may be recorded over multiple seconds or minutes. In one embodiment, gaps in the acoustic output when the target vehicle was unpowered, or when the acoustic transducers failed to collect sound from the target vehicle may be discarded or excluded from the recording of the target acoustic output. The target acoustic output establishes what the target vehicle sounds like during powered operation. The target acoustic output may be compared with what a reference vehicle of the first type is expected to sound like in order to determine whether or not the target vehicle is of a second type of vehicle that is disguised as the first type of vehicle.

In one embodiment, acoustic disguise detection method 200 scans a target vehicle in order to produce measurements of the target acoustic output. In one embodiment, scanning causes the acoustic transducers and spectrum analyzer to convert sound produced by powered operation of the target vehicle into a computer-readable representation of measurements of the acoustic output at fine grain frequencies. The measurements record amplitudes of fine-grain frequencies of the acoustic output of the target vehicle over a period of time in which the scan was performed.

Thus, in one embodiment, acoustic disguise detection method 200 records a target acoustic output of a target vehicle that appears to be of a first type by receiving sounds generated by powered operation of the vehicle, characterizing the sounds as amplitude values per individual frequency over time, and storing the characterized sounds. Process block 210 then completes, and acoustic disguise detection method 200 continues at process block 215. In one embodiment, the functions of process block 210 are performed by target recorder 105. At the conclusion of process block 210, target acoustic output of the target vehicle has been characterized as amplitude values for fine frequencies over time, and stored for subsequent reference. The target acoustic output characterizes the sound of powered operation of the target vehicle for subsequent analysis and comparison with acoustic output for an apparent type of the target vehicle.

—Example Method—Retrieving Reference Acoustic Output—

At process block 215, acoustic disguise detection method 200 retrieves a second acoustic output of a reference vehicle that is known to be of the first vehicle type. For convenience, the acoustic output of the reference vehicle may be referred to herein as "second acoustic output" or "reference acoustic output". In one embodiment, acoustic disguise detection method 200 obtains sound that is representative of the first type of vehicle (or first vehicle type). A reference acoustic output should be from a vehicle that is known to be of a particular type because the reference and target acoustic outputs should match if the target vehicle is of the first vehicle type and unmodified. Otherwise, it is likely that a configuration or other characteristics of the target vehicle are modified.

In one embodiment, the reference acoustic output is recorded from a vehicle that is known to be of the first type. A vehicle may be known to be of a given type as ground truth through observation or investigation of the vehicle to verify the type of the vehicle. A vehicle may be known to be of a given type based on empirical observation that the vehicle has a configuration that is consistent with the type. A vehicle that is known to be of a given type such as the first type may be referred to herein as a reference vehicle or a golden system. The reference vehicle is observed to have a configuration that is consistent with the first type of vehicle. Knowledge that the reference vehicle is of the first type is thus at a directly observed, ground-truth level.

In one embodiment, a reference vehicle may be known to be of a reference (or first) type at a time of recording the reference acoustic output. For example, the reference acoustic output may be recorded from powered operation of the reference vehicle by a manufacturer of the reference vehicle, where the manufacturer has constructed the reference vehicle in accordance with the first type. Or, for example, the reference acoustic output may be recorded from powered operation of the reference vehicle by an enforcement agency in possession of the reference vehicle, where the enforcement agency has confirmed the reference vehicle to be constructed in accordance with the first type. The reference acoustic output therefore establishes what vehicles of the first type are expected to sound like during powered operation.

For example, a standard, unmodified, or stock instance of a 2023 Honda Accord EX is the first type of vehicle. A vehicle may be known to be a standard, unmodified, or stock instance of a 2023 Honda Accord EX by obtaining the vehicle directly from the manufacturer or dealer, comparing a configuration of the vehicle to specifications or other documentation, or otherwise empirically verifying that the vehicle is an unmodified 2023 Honda Accord EX. If the target vehicle is also a standard, unmodified, or stock instance of a 2023 Honda Accord EX, the target vehicle should have target acoustic output that matches reference acoustic output for a standard, unmodified, or stock instance of a 2023 Honda Accord EX.

In one embodiment, the reference acoustic output is retrieved by locating the reference acoustic output in storage and then accessing the reference acoustic output. In one embodiment, the reference acoustic output is stored in a library of acoustic fingerprints or other data structure. In one embodiment, the library of acoustic fingerprints stores reference acoustic output. In one embodiment, the library of acoustic fingerprints stores reference acoustic fingerprints generated from the reference acoustic output. Acoustic outputs for multiple types of vehicle may be stored in the library of acoustic fingerprints. The reference acoustic output is associated in the library of acoustic fingerprints with vehicles of the first type. Data entities such as the reference acoustic output and vehicle type may be associated in a database (or other data structure) such as the library acoustic fingerprints for example by sharing a key, identifier, or other attribute in common, by appearing together in an individual row of a table, or otherwise linking the data entities.

In one embodiment, the reference acoustic output may be retrieved based on an apparent type of the target vehicle. In one embodiment, an observer, for example a user or a machine vision system, may determine that the target vehicle appears to be of the first type. The library of acoustic fingerprints may then be searched for the first type automatically in response to the determination that the target vehicle appears to be of the first type. For example, where a target vehicle looks like a Caymas 401 CC fishing boat, the library of acoustic fingerprints is accessed to find reference acoustic output or reference acoustic fingerprint for a Caymas 401 CC fishing boat. The reference acoustic output or reference acoustic fingerprint in the library are generated from a known unmodified Caymas 401 CC fishing boat. The acoustic output of the target vehicle may then be compared with reference acoustic output (or fingerprint) for a Caymas 401 CC fishing boat to determine whether the target vehicle is a Caymas 401 CC fishing boat.

Or, in one embodiment, the reference acoustic output may be retrieved based on a type recorded for a registration of the target vehicle. In one embodiment, an observer such as a user or a machine vision system may read a registration number of the vehicle, look up the vehicle by the registration number to determine that the target vehicle is registered to be of the first type. The library of acoustic fingerprints may then be searched to retrieve the reference acoustic fingerprints that are associated or assigned to the first vehicle type. In one embodiment, the search for the reference acoustic fingerprints may be performed automatically in response to the registration of the vehicle being set as the first type. Additional information about access and retrieval of information about the test vehicle from a library of acoustic fingerprints is discussed below under the heading "Acoustic Fingerprint Library".

Once located by search or lookup of the first type in the library of acoustic fingerprints, the reference acoustic output may be accessed, for example, by reading the reference acoustic output from its location in the library of acoustic fingerprints. The values of the reference acoustic output may be copied or streamed from the library of acoustic fingerprints for subsequent processing.

In one embodiment, an acoustic fingerprint is a reduced, compressed, or stripped-down representation of acoustic output with time series for a set of component frequencies of the acoustic output that are most informative about the vehicle. In one embodiment, the acoustic fingerprint is a data structure including a time series database made up of time series for the set of component frequencies. In one embodiment, the acoustic fingerprint is formed by performing a bivariate frequency-domain to time-domain transformation that groups fine frequencies of the acoustic output into coarse frequency bins, and selects the coarse frequency bins that are most informative to form component time series of the acoustic fingerprint. In one embodiment, an acoustic fingerprint characterizes a frequency-domain signature of operation of a vehicle in the time domain based on the most informative time series. In one embodiment, an acoustic fingerprint may be used to automatically identify a vehicle based on sounds made by the vehicle. Additional detail on acoustic fingerprints is provided elsewhere herein, for example as described below with reference to FIGS. 3-6.

In one embodiment, the reference (second) acoustic output is retrieved in an uncompressed format, including a series of amplitude values for fine frequencies over a period of time. In one embodiment, the reference acoustic output is retrieved as an acoustic fingerprint. The acoustic fingerprint for the reference acoustic output (referred to herein as a reference acoustic fingerprint) includes time series of amplitude values for a set of component frequencies that are most informative about the powered operation of the first type of vehicle. The reference acoustic fingerprint thus also specifies the set of component frequencies that are most informative about the powered operation of the first type of vehicle.

In one embodiment, acoustic disguise detection method 200 retrieves a reference acoustic output of a reference vehicle that is known to be of the first type by determining the first type to be apparent type of the target vehicle, searching the library for the first type to look up the reference acoustic output, and accessing the second acoustic output. Process block 215 then completes, and acoustic disguise detection method 200 continues at process block 220. In one embodiment, the functions of process block 215 are performed by reference retriever 110. At the completion of process block 220, acoustic disguise detection method 200 has located and accessed second (reference) acoustic output of what the target device should sound like, provided that the target device is of the first type. The reference (second) acoustic output is made available for comparison with the target (first) acoustic output to identify acoustic dissimilarity (or similarity) between the target acoustic output from the target vehicle and the reference (second) acoustic output from the reference vehicle.

—Example Method—Acoustically Detecting Vehicle to be Disguised—

At process block 220, acoustic disguise detection method 200 acoustically detects that the target vehicle is not of the first type based at least on an acoustic dissimilarity between the target (first) acoustic output and the reference (second) acoustic output. For example, acoustic disguise detection method 200 may detect a difference (or acoustic dissimilarity) between the sounds emitted by the target vehicle and the expected sounds for the first type of vehicle. Where the acoustic dissimilarity is sufficiently large, the target vehicle may be indicated to be in disguise. Thus, in one embodiment, acoustic disguise detection method 200 acoustically detects whether the target vehicle matches the vehicle type based at least on an acoustic similarity to the reference acoustic output.

Alterations to the hull of a target vehicle away from a configuration for a first type of vehicle changes a load on the engine and/or drive train of the target vehicle. The altered load changes the engine noise produced while the target vehicle is operating under power. The change due to the altered load makes the engine noise different from what would be expected for a vessel of the first type. The altered load is detectible in the acoustic output of the target vehicle. Changes to the engine or drivetrain of a vehicle away from a configuration for a first type cause the target vehicle to produce engine noises when operating under power other than what would be expected for a vessel of the first type. The changed engine or drivetrain is detectible in the acoustic output of the target vehicle.

In one embodiment, the acoustic detection that the target vehicle is not of the first type is carried out based on the target acoustic output passively recorded from the target vehicle and the reference acoustic output from the reference vehicle. In particular, the acoustic detection detects that the target vehicle is not of the first type based on an acoustic dissimilarity between the target acoustic output and the reference acoustic output. The target vehicle is detected to be not of the first type (and is instead disguised as the first type) because the sounds produced by the target and reference vehicles are not enough alike.

In one embodiment, the likeness or similarity of the acoustic outputs may be analyzed acoustically by comparing the behavior at a few selected component frequencies of the acoustic outputs. The selected component frequencies are a number of top component frequencies in terms of information content carried about the engine noise. Pairs of time series signals (TSSs) that correspond in terms of component frequency are sampled from both the target acoustic output and the reference acoustic output. For each of the selected component frequencies, one time series signal of a pair is sampled from the target acoustic output to form a time series signal for the target vehicle at the selected frequency (referred to herein as a target time series signal). And, for each of the selected component frequencies, one time series signal of the pair is sampled from the reference acoustic output to form a time series signal for the reference vehicle (referred to herein as a reference time series signal).

In one embodiment, the target time series signals for all the component frequencies make up a time series database for the target acoustic output the target vehicle that may be referred to herein as a target acoustic fingerprint. In one embodiment, the reference time series signals for all the component frequencies make up a time series database for the target acoustic output the target vehicle that may be referred to herein as a reference acoustic fingerprint. Additional detail about selection of most informative component frequencies and sampling of acoustic output to form acoustic fingerprints is provided below, for example with reference to process block 410 of FIG. 4, and with reference to FIG. 5 under the heading "Example Generation of Acoustic Fingerprint". Thus, a target acoustic fingerprint is generated from the target acoustic output, and a reference acoustic fingerprint is generated from the reference acoustic output.

In one embodiment, the top frequencies are selected in terms of information content carried about the reference engine noise. In one embodiment, the reference acoustic output has previously been converted to a reference acoustic fingerprint, as described elsewhere herein. The process of selecting the top component frequencies is therefore already completed for the reference acoustic fingerprint, and the top component frequencies already indicated in the reference acoustic fingerprint will be chosen for creating a target acoustic fingerprint.

In one embodiment, the disguised or not disguised state of the target vehicle is detected acoustically based on residuals between component time series signals of the reference time series database and corresponding (in terms of frequency) component time series signals of the target time series database. In one embodiment, the values of the component time series signals of the reference time series database represent what the engine noise is expected to be for the first type of vehicle. In one embodiment, the values of the component time series signals of the target time series database represent what the engine noise actually is for the target vehicle. In one embodiment, the residuals between the component signals for the reference and target time series database represents how far the engine noise of the target vehicle departs from that is expected for the first type of vehicle. Additional detail about generation of residuals between the reference and target acoustic fingerprints is provided below, for example, with reference to process block 415 of FIG. 4, and under the heading "Example Similarity and Matching of Target and Reference Vehicles".

In one embodiment, the difference between the actual and expected engine noise for the target device may be reduced to a single similarity metric. The similarity metric enables straightforward determinations of whether or not a vehicle is disguised based on acoustics using a single value. In one embodiment, a mean absolute error (MAE) is generated from the residuals between the corresponding component time series signals of the reference and target acoustic fingerprints. A residual may also be referred to as the error. Thus, the mean absolute error between a component time series signal of a target acoustic fingerprint and a corresponding component time series signal of the reference acoustic fingerprint is the absolute value of the mean of the residuals between the corresponding component time series signals.

In one embodiment, a mean absolute error is generated for each corresponding pair of component time series signals. The MAE values for the component frequencies of the acoustic fingerprints are then combined, for example by addition, to generate a cumulative mean absolute error (CMAE) between all corresponding time series signals of the target and reference acoustic fingerprints. In one embodiment, the CMAE is used as a single similarity metric that is a measure of acoustic similarity between the actual and expected engine noise for the target device. Thus, in one embodiment, the CMAE is calculated between the target acoustic fingerprint and the reference acoustic fingerprint. The CMAE represents the acoustic dissimilarity as a single quantity. Additional detail about generation of the MAE and CMAE is provided below, for example, with reference to process block 415 of FIG. 4, and under the heading "Example Similarity and Matching of Target and Reference Vehicles".

In one embodiment, the CMAE quantifies a magnitude of acoustic dissimilarity between the target (first) acoustic output generated by the target vehicle and the reference (second) acoustic output generated by the reference vehicle for the apparent type of the target vehicle. In other words, the CMAE similarity metric measures acoustic dissimilarity. In one embodiment, the likelihood or certainty that the target vehicle is not the type of vehicle that the target vehicle appears to be grows larger as the CMAE similarity metric grows larger. And, in one embodiment, the likelihood or certainty that the target vehicle is in actuality the type of vehicle that the target vehicle appears to be grows larger as the as the CMAE similarity metric grows smaller. Therefore, the target vehicle may be acoustically detected to be disguised where the CMAE similarity metric becomes so large as to indicate that the target vehicle is highly certain to be of a second type of vehicle that differs from the first type of vehicle.

In one embodiment, a threshold level of the CMAE similarity metric may be set that defines where the acoustic dissimilarity is sufficient to indicate that the target vehicle is not of the first type of vehicle that the target vehicle appears to be, and is instead of a second type of vehicle that differs from the first type of vehicle. In one embodiment, the threshold level may be provided or set by a user or administrator of acoustic disguise detection system 100. Lower thresholds increase sensitivity for detection of disguised vehicles and enables detection of more subtle differences, and may increase false alerts and decrease missed alerts. Higher thresholds decrease sensitivity for detection of disguised vehicles, which may limit detection to more obvious disguises, decreasing false alerts and increasing missed alerts. In one embodiment, the user may select a threshold level that is tailored to detect a sort of disguise that target vessels are expected to have if engaged in transporting illicit cargo.

In one embodiment, where the CMAE similarity metric is below the threshold level, the threshold for determining a vehicle to be disguised is unsatisfied, and no alert will be generated. And, where the CMAE similarity metric is equal to or greater than the threshold level, the threshold for determining a vehicle to be disguised is satisfied, and an alert will be generated. Additional detail about the threshold level for the CMAE similarity metric is provided below, for example, with reference to process block 420 of FIG. 4.

Thus, in one embodiment, acoustic disguise detection method 200 acoustically detects that the target vehicle is not of the first type based on acoustic dissimilarity between the target and reference acoustic outputs. Top component frequencies of acoustic output are selected based on amount of information carried about engine noise. Time series signals are generated for the selected component frequencies from the target (first) acoustic output to produce a target acoustic fingerprint, and from the reference (second) acoustic output to produce a reference acoustic fingerprint. Residuals are generated between the time series signals of the target and reference acoustic fingerprints. Mean absolute errors are generated for residual time series for the component frequencies. A cumulative mean absolute error is generated from the mean absolute errors to be a similarity metric that represents the acoustic dissimilarity. The cumulative mean absolute error is compared to a threshold to determine if the cumulative mean absolute error (similarity metric) has become large enough to indicate that the target vehicle is disguised. Process block 220 then completes, and acoustic disguise detection method 200 continues at process block 225. In one embodiment, the functions of process block 220 are performed by vehicle dissimilarity detector 115. At the completion of process block 220, acoustic cargo surveillance method has acoustically determined whether (or not) the target and reference acoustic outputs are so acoustically dissimilar as to show that the target vehicle is disguised. The determination that the target vehicle is disguised can be used to trigger generation of an electronic alert.

—Example Method—Alert Generation—

At process block 225, acoustic disguise detection method 200 generates an electronic alert that the target vehicle is of a second type that is disguised as the first type based on the acoustic dissimilarity. In one embodiment, the electronic alert indicates that the target vehicle is suspected of being a modified or counterfeit vehicle disguised as an unmodified or actual vehicle of an apparent type of the target vehicle. In one embodiment, the electronic message is generated when the CMAE is found (at process block 220) to be large enough to indicate that the target vehicle has acoustic output that is not consistent with the apparent type of the target vehicle. In one embodiment, acoustic disguise detection method 200 generate an electronic alert that the target vehicle either is, or is not, the vehicle type based on the acoustic similarity (or dissimilarity) to the reference acoustic output. In one embodiment, acoustic disguise detection method 200 may generate an electronic alert that the target vehicle is a modified version of the reference vehicle based on acoustic dissimilarity.

The electronic alert indicates that that the target vehicle is disguised as the first type. The disguise of the target vehicle may be in various forms. The target vehicle is disguised when it appears, intentionally, to be a type of vehicle that it is not. In other words, the target vehicle is in disguise when it is configured to deceptively look like a particular type of vehicle. For example, in one embodiment, the target vehicle is disguised as the first type when it has been modified away from the first type to the second type in a way that is not immediately visible in order to hide an ulterior or illicit purpose. In one embodiment, the vehicle is disguised by being constructed to appear to be a particular type of vehicle, but is constructed in a different way or with different parts in order to hide an illicit purpose. Thus, in one embodiment, the target vehicle is disguised as the first type of vehicle by being constructed as the second type of vehicle using parts other than or in addition to components used to construct the first type of vehicle, wherein the second type of vehicle is configured to deceptively appear to be the first type in order to conceal an illicit purpose of the second type of vehicle.

For example, the target vehicle may be modified to have overpowered engines or an enlarged cargo hold below the waterline. Thus, the target vehicle may be disguised by being modified to carry illicit cargo while appearing unmodified. In one embodiment, the target vehicle is a counterfeit vehicle that imitates the appearance and operation of the first type of vehicle so as to be deceptively passed off as an authentic instance of the first type of vehicle. For example, the target vehicle may be a fake or unauthorized copy of a genuine vehicle. In general, "disguise" as used herein in the context of vehicles refers to structural or mechanical differences between what a vehicle is in actuality, and what the vehicle is intended to be. In one embodiment, acoustic disguise detection may be used to detect each of the foregoing disguise situations. Note that, because the disguises of vehicles as used herein are structural or mechanical, the term disguise does not refer to surface blankets, shrouds, paint, wraps, camouflage patterns, or other "costumes" that are readily removable to reveal the actual nature of the vehicle.

In one embodiment, the electronic alert is generated by composing and transmitting a computer-readable message including content describing the detected disguise of type of the target vehicle. In one embodiment, the electronic alert includes an indication that the target vehicle is disguised as a second type of vehicle. In one embodiment, the electronic alert includes a similarity metric. In one embodiment, the electronic alert includes a CMAE of residual time series for component frequencies of acoustic output.

In one embodiment, the electronic alert includes an indication of a time at which the target vehicle was detected as disguised. The time may be indicated, for example, as elapsed time from commencement of acoustic surveillance, or for example, as a clock time at which the detection occurred.

In one embodiment, the electronic alert includes an identifier for the target vehicle that is under acoustic surveillance. In one embodiment, the electronic alert includes location information such GPS coordinates, latitude and longitude, triangulated location, or other location descriptions for the vehicle under surveillance and/or the acoustic transducers used for passive surveillance of the vehicle.

The results of the threshold comparison test discussed above with reference to process block 220 are checked to determine whether the electronic alert should be generated. In response to the threshold being satisfied, process block 225 executes and the electronic alert is generated. In one embodiment, in response to the threshold not being satisfied or no anomaly being detected, process block 225 is bypassed and no electronic alert is generated. In one embodiment, in response to the threshold not being satisfied an alternative electronic message indicating that the target vehicle is an unmodified instance of a reference type of vehicle (and is not another type of vehicle disguised as the reference type) may also be composed and transmitted. In one embodiment, the alternative electronic message may include similar information to that described above for inclusion in the electronic alert.

The electronic alert may be composed and then transmitted for subsequent presentation on a display or other action. The electronic alert may be configured to be presented by display in a graphical user interface (GUI). Further detail regarding display of the electronic alert in a GUI is discussed below, for example with reference to FIG. 7 under the heading "Example GUI for Acoustic Disguise Detection".

In one embodiment, the electronic alert is a message that is configured to be transmitted over a network, such as a wired network, a cellular telephone network, wi-fi network, or other communications infrastructure. The electronic alert may be configured to be read by a computing device. The electronic alert may be configured as a request (such as a REST request) used to trigger initiation of a function. The electronic alert may be presented by extracting the content of the electronic alert by a REST API that has received the electronic alert. In one embodiment, the electronic alert is transmitted in order to initiate an interdiction response. A dispatch system may be configured to automatically dispatch enforcement agency personnel and/or equipment to the location of the target vehicle.

In one embodiment, acoustic detection that the target vehicle is not of the first type (and therefore disguised as the second type) (for example as in process block 220) and generation of the electronic alert of process (for example as in process block 225) may be performed in one or more batches at a time later than the recording of the target (first) acoustic output from the target vehicle (for example as in process block 210).

In one embodiment, acoustic detection of the fact that the target vehicle is not of the first type (and therefore disguised as the second type) and generation of the electronic alert may be completed live, in real-time (or near real-time) so as to present the electronic alert at a time substantially immediately following recording the target acoustic output of the target vehicle and retrieving the reference acoustic output for a reference vehicle that is of the apparent type of the target vehicle. In one embodiment, as used herein "real-time" refers to substantially immediate operation that keeps pace with a throughput of a stream of data. In one embodiment, real-time operations are subject only to a minimal delay or latency that is acceptable in the context of live surveillance of a target vehicle. For example, substantially immediate real-time operation of acoustic disguise detection method 200, availability of the electronic alert is subject to a minimal delay or latency between receiving the target and reference acoustic outputs and transmission of electronic alert that the target vehicle is (or is not) disguised.

Thus, in one embodiment, in response to the acoustic dissimilarity satisfying the threshold for determining the target vehicle to be disguised, the acoustic disguise detection method 200 generates an electronic alert that the target vehicle is (or is suspected to be) disguised based on the acoustic dissimilarity by composing an electronic message that describes the acoustic dissimilarity (for example with a similarity metric such as the CMAE), and transmitting the electronic message for display or for initiation of an interdiction response.

Process block 225 then completes, and acoustic disguise detection method 200 proceeds to END block 230, where acoustic disguise detection method 200 completes. In one embodiment, the functions of process block 225 are performed by alert generator 120.

Thus, at the conclusion of acoustic disguise detection method 200, hidden modifications to a vehicle have been detected entirely passively using acoustic surveillance. Enforcement authorities may be informed of the suspected presence of modifications to store as evidence in an investigation, or to initiate an interdiction response against the vehicle in order to investigate the modifications, seize illicit cargos, rescue trafficked persons, and/or arrest criminal actors.

In one embodiment, acoustic disguise detection method 200 records a target acoustic output of a target vehicle that appears to be of a vehicle type. Acoustic disguise detection method 200 then retrieves a reference acoustic output of a reference vehicle that is known to be of the vehicle type. Acoustic disguise detection method 200 then acoustically detects whether the target vehicle matches the vehicle type based at least on an acoustic similarity to the reference acoustic output. Acoustic disguise detection method 200 then generates an electronic alert that the target vehicle is or is not the vehicle type based on the acoustic similarity to the reference acoustic output.

In one embodiment, acoustic disguise detection method 200 records a first (target) acoustic output of a target vehicle that appears to be of a first type of vehicle. Acoustic disguise detection method 200 then retrieves a second (reference) acoustic output of a reference vehicle that is known to be of the first type of vehicle. Acoustic disguise detection method 200 then acoustically detects that the target vehicle does not match the first type of vehicle based at least on an acoustic dissimilarity between the first (target) acoustic output and the second (reference) acoustic output. Acoustic disguise detection method 200 then generates an electronic alert that the target vehicle is a modified version of the reference vehicle based on the acoustic dissimilarity.

Thus, in one embodiment, acoustic disguise detection method 200 records sound of a vehicle and compares the sound to sound of another vehicle. If the sounds of the vehicles don't match, the acoustic disguise detection method 200 generates an alert.

—Further Embodiments of Acoustic Disguise Detection Method Change—

In one embodiment, acoustic disguise detection method 200 uses the target (first) acoustic output to identify that the target vehicle is modified to carry illicit cargo while appearing unmodified.

In one embodiment, the acoustic dissimilarity of process block 215 is determined by comparing an acoustic fingerprint for the target vehicle to an acoustic fingerprint for the reference vehicle. Therefore, in one embodiment, the acoustic dissimilarity is determined by generating a target acoustic fingerprint from the target acoustic output and generating a reference acoustic fingerprint from the reference acoustic output, followed by computing a cumulative mean absolute error between the target acoustic fingerprint and the reference acoustic fingerprint. The cumulative mean absolute error represents the acoustic dissimilarity. In one embodiment, the reference acoustic fingerprint was previously generated, and retrieved along with or as part of the reference acoustic output. Thus, in one embodiment, rather than newly generating a reference acoustic fingerprint from the reference acoustic output, the reference acoustic fingerprint was previously generated from the reference acoustic output and stored for later retrieval and comparison with a target acoustic fingerprint.

In one embodiment, as discussed above with reference to process block 210, acoustic disguise detection method 200 collects engine noise from the target vehicle. Engine noise collected from the target vehicle carries information about the configuration of the target vehicle. Therefore, in one embodiment, recording the target acoustic output (as described in process block 210 above) further includes collecting engine noise that is produced by operation of an engine of the target vehicle. The target acoustic output includes the engine noise. And, recording the target acoustic output further includes storing the engine noise. In one embodiment, the engine noise is stored (along with the rest of the target acoustic output) as one or more time series.

In one embodiment, acoustic disguise detection method 200 surveils the target vehicle from a distance. Thus, in one embodiment, acoustic disguise detection method 200 passively records the target (first) acoustic output with one or more acoustic transducers that are located remotely from the target vehicle. Additional detail regarding acoustic transducers and remote location is discussed below, for example under the headings "Example Acoustic Transducers" and "Example Implementations of Acoustic Disguise Detection".

In one embodiment, the vehicle is one of a variety of types of self-propelled devices for transporting cargo such as persons or things on or in water, through air, or over land. In one embodiment, the vehicle is a watercraft. In one embodiment, the vehicle is an aircraft. In one embodiment, the vehicle is one of a watercraft and an aircraft. In one embodiment, the vehicle is a land craft. Additional detail regarding the types of vehicles is discussed elsewhere herein, for example in the definition of the term "vehicle" under the heading "Definitions" above.

In one embodiment, acoustic disguise detection method 200 detects when vehicles of a given make and model are modified away from an original or stock configuration of the vehicle. The modified vehicle will sound different from a reference vehicle (first type of vehicle) that is in the original or stock configuration. Thus, in one embodiment, the target vehicle being "not of the first type" (as discussed in process block 220) includes the target vehicle being a modified version of the reference vehicle. For example, acoustic disguise detection method may detect when a Caymas 401 CC fishing boat has been modified with additional (and not immediately visible) cargo space based on the difference in sound between an original unmodified Caymas 401 CC (reference vehicle), and a Caymas 401 CC that has been modified with extra cargo space (target vehicle).

In one embodiment, alerts and information about the alert may be displayed using a graphical user interface. In one embodiment, acoustic disguise detection method 200 therefore generates a graphical user interface that includes a status of the electronic alert. In one embodiment, acoustic disguise detection method 200 generates a graphical user interface that includes a status of the electronic alert and a measure of the acoustic dissimilarity. Additional detail regarding the graphical user interface is discussed below, for example with reference to FIG. 7 under the heading "Example GUI for Acoustic Disguise Detection".

In one embodiment, the target vehicle is disguised by being constructed to deceptively appear to be of a first type of vehicle in order to conceal illicit capabilities of a second, actual type of the target vehicle, for example as discussed above under the "Definitions" heading and with reference to process block 225 under the heading "Example Method—Alert Generation". Thus, in one embodiment, the target vehicle is disguised as the first type by being constructed as the second type using parts other than or in addition to components used to construct the first type. And, the second type is configured to deceptively appear to be the first type in order to conceal an illicit purpose of the second type.

In one embodiment, the acoustic output of the target vehicle is compared to a reference acoustic output for the type of vehicle that the target vehicle appears to be. In one embodiment, retrieving the reference (second) acoustic output further includes accepting a user input indicating the first type that the target vehicle appears to be; and looking up the reference acoustic output for the first type in a library of acoustic outputs.

In one embodiment, to retrieve the reference acoustic output (as discussed at process block 215 above), acoustic disguise detection method 200 further searches a library for the reference acoustic output. In one embodiment, the library is a library of acoustic fingerprints. In one embodiment, the reference acoustic output may be searched for in the library based on an apparent type of the target vehicle. In one embodiment, the reference acoustic output may be searched for in the library based on a vehicle type recorded for a registration number of the target vehicle. Additional information about access and retrieval of information about the test vehicle from a library of acoustic fingerprints is discussed below, for example under the heading "Acoustic Fingerprint Library" and with reference to FIG. 7 under the heading "Example GUI for Acoustic Disguise Detection".

In one embodiment, a non-transitory computer-readable medium may include stored thereon computer-executable instructions that when executed by at least a processor of a computer cause the computer to execute method steps for acoustic disguise detection, such as the steps of acoustic disguise detection method 200. In one embodiment, a computing system may include at least a processor, a memory operably connected to the processor, and a non-transitory computer-readable medium operably connected to the processor and memory and storing computer-executable instructions. When executed by at least the processor accessing memory, the instructions cause the computing system to execute method steps for acoustic disguise detection, such as the steps of acoustic disguise detection method 200.

—Overview of Acoustic Fingerprinting for Disguised Vehicle Detection—

In one embodiment, as mentioned above, acoustic fingerprinting of a vehicle may be used to automatically identify the vehicle based on sounds made by the vehicle during powered operation. In one embodiment, an acoustic fingerprinting system automatically extracts the most informative frequencies from the sounds made by the device to form an acoustic fingerprint, and determines how similar the acoustic fingerprint is to a reference. In one embodiment, based on the similarity, the acoustic fingerprinting system can state whether the vehicle matches a known type (or even identify the vehicle as a specific individual).

Figure 3:
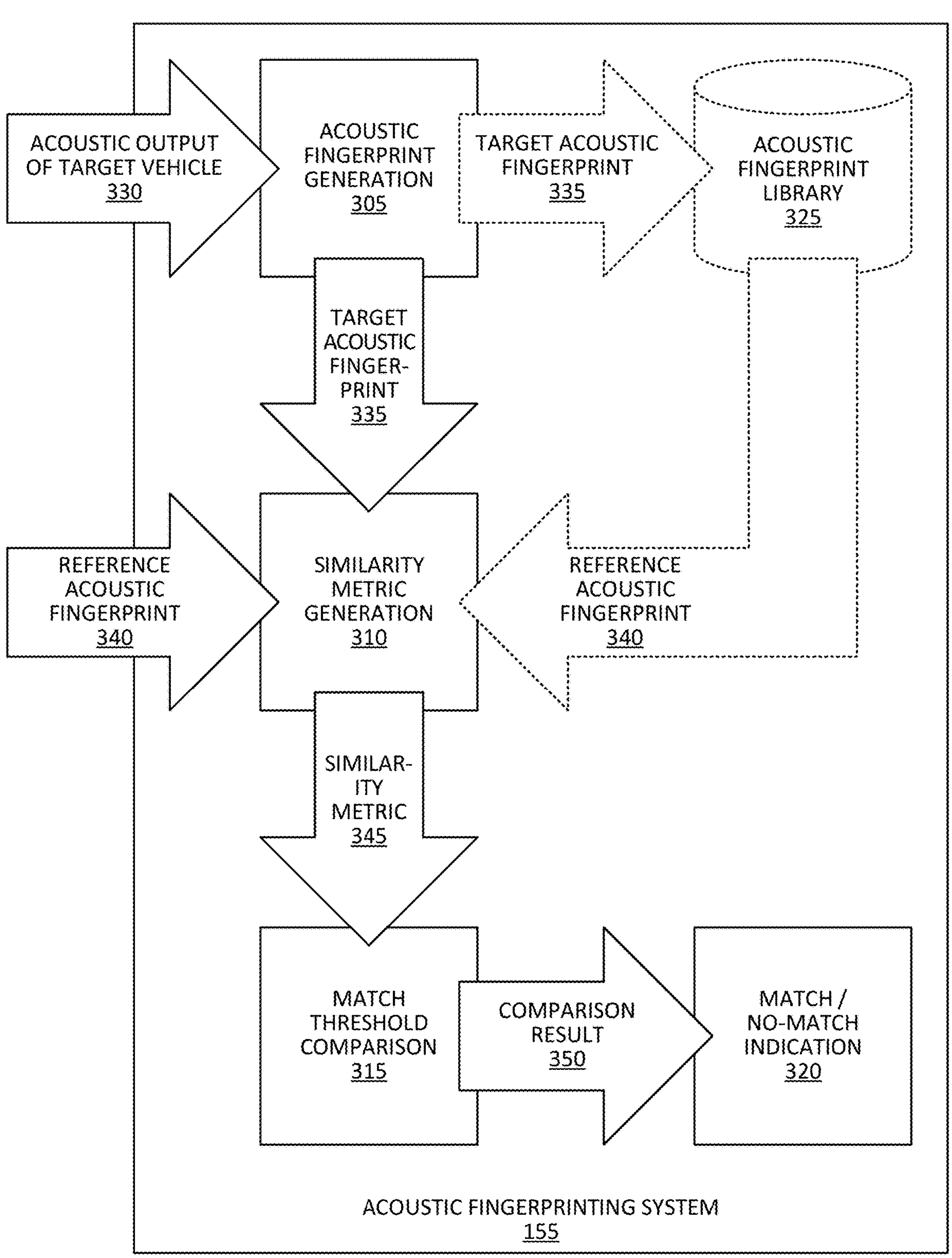
FIG. 3 illustrates one embodiment of an acoustic fingerprinting system associated with acoustic detection of vehicles that are modified to carry illicit cargo while disguised to appear unmodified.

FIG. 3 illustrates one embodiment of an acoustic fingerprinting system 155 associated with acoustic detection of vehicles that are modified to carry illicit cargo while disguised to appear unmodified. Acoustic fingerprinting system 155 includes an acoustic fingerprint generation component 305 configured to generate acoustic fingerprints from input sound signals. Acoustic fingerprinting system 155 includes a similarity metric generation component 310 configured to generate a metric that characterizes or quantifies a similarity between two or more acoustic fingerprints. Acoustic fingerprinting system 155 includes a match threshold comparison component 315 configured to determine whether, based on a similarity metric, two acoustic fingerprints come from a same vehicle, a vehicle of similar type, make and/or configuration, or otherwise sufficiently similar vehicle. Acoustic fingerprinting system 155 includes a match/no match indication component 320 that is configured to signal results of the comparisons between acoustic fingerprints. In one embodiment, acoustic fingerprinting system 155 may include an acoustic fingerprint library 325 configured to store acoustic fingerprints and associated data for subsequent reference. Each of the foregoing components and functions are described in further detail herein.

In one embodiment, acoustic fingerprint generation component 305 is configured to accept acoustic output of a vehicle (such as acoustic output 330 of a target vehicle) as an input. In one embodiment, the acoustic output 330 of the target vehicle is sound waves emitted by operation of a vehicle. The acoustic output is sensed by one or more acoustic transducers that convert the acoustic output to electrical signals representing the acoustic output. The electrical signals representing the acoustic output are provided as input for acoustic fingerprint generation. Thus, in one embodiment, the acoustic output 330 of the target vehicle may be provided as electrical signals from one or more acoustic transducers detecting operation noises of the target vehicle. These electrical signals may be provided live, in real-time, to acoustic fingerprint generation module 305 during surveillance of the target vehicle. In one embodiment, these electrical signals may be pre-recorded, and provided to acoustic fingerprint generation module 305 following surveillance of the target vehicle.

In one embodiment, the acoustic output 330 of the target vehicle forms the basis of a target acoustic fingerprint 335 for the target vehicle. In one embodiment, the acoustic fingerprint is an acoustic operation signature of a vehicle, or a signature of the operational sounds of the vehicle. Acoustic fingerprint generation module 305 may generate the target acoustic fingerprint 335 from the acoustic output 330. In one embodiment, the target acoustic fingerprint includes values sampled over time of selected frequencies within the broad-spectrum acoustic output 330 of the target vehicle. In one embodiment, where the target vehicle is to be compared to a particular reference acoustic fingerprint, the selected frequencies are those selected for inclusion in the reference acoustic fingerprint. The samples may be stored as time-series signals. In one embodiment, the target acoustic fingerprint includes a collection of time-series signals of samples from selected frequencies of the acoustic output 330 of the target vehicle.

In one embodiment, the target acoustic fingerprint 335 generated for the target vehicle is provided as an input to the similarity metric generation component 310. In one embodiment, the target acoustic fingerprint 335 is written to acoustic fingerprint library 325 for subsequent use. In one embodiment, a reference acoustic fingerprint 340 is also provided as an input to the similarity metric generation component 310. In one embodiment, the reference acoustic fingerprint 340 is generated by acoustic fingerprint generation module. In one embodiment, the reference acoustic fingerprint 140 is retrieved from acoustic fingerprint library 325, or from other storage locations.

In one embodiment, similarity metric generation component 310 generates a similarity metric 345 that expresses the extent of similarity or difference between the target acoustic fingerprint 335 and reference acoustic fingerprint 340. In one embodiment, the similarity metric generation component 310 compares the target acoustic fingerprint 335 to the reference acoustic fingerprint 340. The similarity metric generation component 310 to determines an extent to which the target acoustic fingerprint 335 and reference acoustic fingerprint 340 are similar, and/or an extent to which the target acoustic fingerprint 335 and reference acoustic fingerprint 340 differ. In one embodiment, similarity metric 345 is a value that characterizes the extent of similarity or difference.

In one embodiment, the value of the similarity metric 345 is compared to a threshold that indicates whether the target acoustic fingerprint 335 and the reference acoustic fingerprint 340 are a match. In one embodiment, the similarity metric 345 is provided as an input to match threshold comparison component 315. In one embodiment, a pre-determined match threshold is provided as an input to match threshold comparison component 315. In one embodiment, the match threshold indicates a level of similarity beyond which the target acoustic fingerprint and reference acoustic fingerprint are considered to match each other. The threshold may vary based on whether the desired level of match is a less restrictive match of vehicle type, such as make and model, or a unique match with a particular individual vehicle. In one embodiment, the match threshold comparison component 315 produces a comparison result 350 that indicates a match or no-match between the acoustic fingerprints.

In one embodiment, the comparison result 350 is provided to match/no match indication component 320. In one embodiment, match/no match indication component 320 generates a signal indicating whether the target vehicle is or is not a match to the reference vehicle based on the comparison result 350. This signal may be sent to other components or client systems of acoustic fingerprinting system 155. In one embodiment, match/no match indication component 320 is a user interface, such as a graphical user interface configured to present an alert to a user of acoustic fingerprinting system 155. In one embodiment, the alert indicates whether the target vehicle is or is not a match to the reference vehicle based on the comparison result 350.

—Example Method for Acoustic Fingerprint Identification of a Vehicle—

Figure 4:
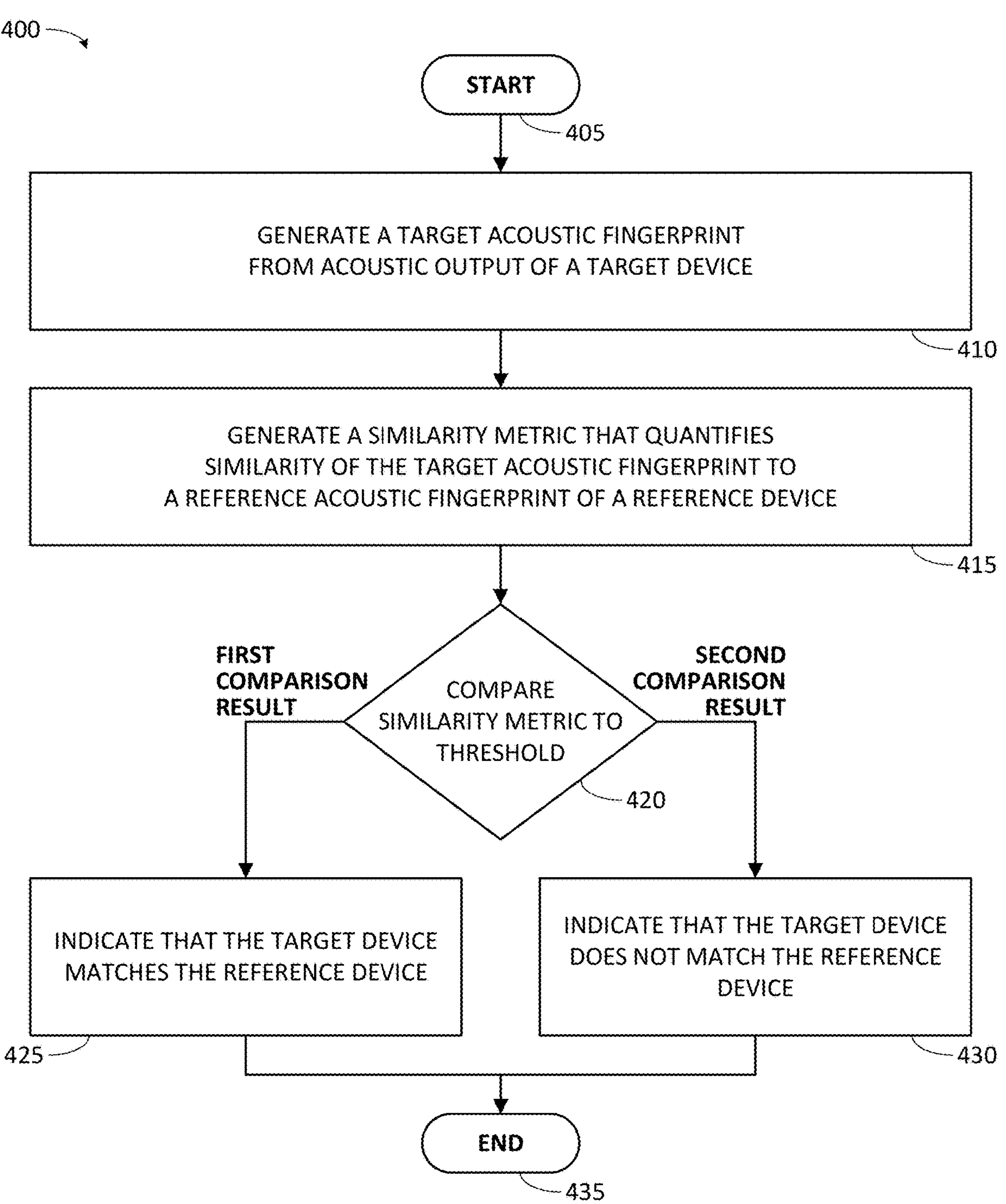
FIG. 4 illustrates one embodiment of an acoustic fingerprinting method 400 associated with acoustic detection of vehicles that are modified to carry illicit cargo while disguised to appear unmodified.

FIG. 4 illustrates one embodiment of an acoustic fingerprinting method 400 associated with acoustic detection of vehicles that are modified to carry illicit cargo while disguised to appear unmodified. At a high level, in one embodiment, acoustic fingerprinting method 400 is a method for determining whether a target vehicle matches a reference vehicle based on similarity between acoustic fingerprints of the target and reference vehicles.

As an overview, in one embodiment, the acoustic fingerprinting method 400 generates an acoustic fingerprint for the target (also referred to as a target acoustic fingerprint). The target acoustic fingerprint provides a signature of sounds made by the target vehicle during operation. The acoustic fingerprinting method 400 then generates a similarity metric that quantifies similarity between the target acoustic fingerprint and a reference acoustic fingerprint. The reference acoustic fingerprint provides a signature of sounds made by a reference vehicle during operation. The similarity metric provides a value that indicates an extent to which the target and reference acoustic fingerprints resemble each other or differ from each other. The acoustic fingerprinting method 400 then compares the similarity metric to a threshold. The threshold may be a pre-determined threshold indicating an amount of similarity that distinguishes between a match or non-match of the fingerprints. By extension, match between the target and reference acoustic fingerprints indicates match between the target and reference vehicles. Accordingly, in response to the comparison result between the target and reference acoustic fingerprints, the acoustic fingerprinting method 400 indicates that the target vehicle either matches, or does not match, the reference vehicle.

In one embodiment, the acoustic fingerprinting method 400 initiates at start block 405 in response to determining one or more of: (i) that a vehicle dissimilarity detector (such as vehicle dissimilarity detector 115) has received a target (first) acoustic output and a reference (second) acoustic output to analyze for acoustic dissimilarity; (ii) that an instruction to perform process block 220 of method 200 has been received by acoustic disguise detection system 100; (iii) a user or administrator of acoustic disguise detection system 100 has initiated method 400; (iv) it is currently a time at which acoustic fingerprinting method 400 is scheduled to be run (for example, to process a batch of surveillance); or (v) that acoustic fingerprinting method 400 should commence in response to occurrence of some other condition. Acoustic fingerprinting method 400 continues to process block 410.

At process block 410, acoustic fingerprinting method 400 generates a target acoustic fingerprint from acoustic output of a target vehicle. In one embodiment, an acoustic fingerprint is a signature that characterizes sound produced during the operation of a vehicle. In one embodiment, this fingerprint or signature includes acoustic information that is specific to the operation of a specific vehicle, such as acoustic components of engine noise. Such an acoustic fingerprint may be used to uniquely identify a vehicle. Therefore, in one embodiment, the target acoustic fingerprint is generated from the acoustic output of the target vehicle to be an acoustic operation signature that is specific to the target vehicle.

In one embodiment, to generate the acoustic fingerprint, the processor performs a bivariate frequency-domain to time-domain transformation of the fine frequency amplitude information in the acoustic output of the target vehicle. The processor then forms the acoustic fingerprint from time series signals of amplitude values in selected frequency ranges.

In one embodiment, to effect the frequency-domain to time-domain transformation, the processor divides or groups the fine frequencies of the acoustic output into coarse frequency bins. In one embodiment, the range of fine frequency signals in a coarse frequency bin are represented by a representative signal for the frequency bin.

The processor then selects a set of one or more of the frequency bins for sequential sampling to create time series signals. In one embodiment, where the acoustic fingerprint is an acoustic fingerprint for a target vehicle, the set of frequency bins selected for sampling are those that are most informative—that is, most information bearing—about the operation of a reference vehicle to which the target vehicle is to be compared.

In one embodiment, the processor creates a time series signal (TSS) for each frequency bin in the set to create a TSS for the frequency bin. In one embodiment, the processor creates a set of component TSSs by sampling representative frequencies of the set of bins to extract their amplitude values at intervals over a period of time. In one embodiment, a sample is taken from a bin or representative frequency of the bin by retrieving the value of the representative frequency at a specified point in time, such as on the interval. In one embodiment, the processor samples the amplitude of the representative signal of each frequency bin at intervals to generate signal values of the TSS for the frequency bin. In one embodiment, the sampling rate for the TSS may be lower than the sampling rate of the representative frequency. The processor uses the TSSs as component signals of the acoustic fingerprint.

Process block 410 then completes, and acoustic fingerprinting method 400 continues at process block 415. At the completion of process block 410, acoustic fingerprinting method 400 has generated a target acoustic fingerprint that describes or characterizes operational acoustic output of a target vehicle. This target acoustic fingerprint may be compared with a reference acoustic fingerprint to identify the target vehicle. Further details regarding generation of a target acoustic fingerprint from acoustic output of a target vehicle are described elsewhere herein.

At process block 415, acoustic fingerprinting method 400 generates a similarity metric that quantifies similarity of the target acoustic fingerprint to a reference acoustic fingerprint of a reference vehicle. In this way, the target acoustic fingerprint may be compared to the reference acoustic fingerprint to determine how similar or different the acoustic fingerprints are from one another. The similarity metric is a value that quantifies the results of the comparison between target and reference acoustic fingerprints. The similarity metric thus describes similarity of the acoustic fingerprints, and by extension, the similarity of the target and reference vehicles. The similarity metric may be used as a basis for determining whether or not the target and reference vehicles match.

In one embodiment, the corresponding component TSSs of target and reference acoustic fingerprints are compared. In this comparison, signal values of the corresponding component TSSs are compared pairwise to find a residual (also referred to as the error) between each pair. The absolute mean of the residuals (errors) for the values of the corresponding component TSSs is then calculated to find a mean absolute error (MAE) between the component TSSs. The MAE quantifies similarity or likeness of the target and reference acoustic fingerprint in the frequency range represented by the corresponding component TSSs.

In one embodiment, this process of finding the MAE is performed for more than one pair of corresponding component TSSs between the target and reference acoustic fingerprints. For example, this process of finding the MAE may be performed for each pair of corresponding component TSSs between the target and reference acoustic fingerprints. The processor then finds a cumulative MAE (CMAE) between the target and reference acoustic fingerprints by finding the sum of the MAEs. The CMAE combines the MAEs between corresponding component TSSs to produce a single similarity metric that quantifies overall similarity or likeness of the target and reference acoustic fingerprints.

With the generation of the CMAE similarity metric, process block 415 completes, and acoustic fingerprinting method 400 continues at decision block 420. At the completion of process block 415, the complex question of the extent to which acoustic output of a target vehicle resembles acoustic output of a reference vehicle has been characterized or quantified in a simple similarity metric. The values of the similarity metric for target and reference acoustic fingerprints may be used to determine whether the target and reference vehicles match.

At decision block 420, acoustic fingerprinting method 400 compares the similarity metric to a threshold. In one embodiment, the threshold describes a level of similarity between a target and reference acoustic fingerprint that distinguishes between a match and non-match. The threshold level may differ based on how similar the acoustic output of a vehicles should be for them to be considered matches. The threshold level may also be governed or dictated by the nature of the match. For example, a match of a target vehicle to a make and model may have a relatively less restrictive threshold. Or, for example, a match of a target vehicle to a particular individual vehicle may have a relatively more restrictive threshold. In one embodiment, where a lower similarity metric value represents greater similarity (such as may be the case where the similarity metric is the CMAE), a relatively smaller or lower threshold is more restrictive than a relatively larger or higher threshold.

In one embodiment, the processor evaluates whether or not the value of the similarity metric satisfies the threshold. In one comparison result, the similarity metric satisfies the threshold. For example, the value of the CMAE between the target and reference acoustic fingerprints may be less than or equal to the threshold. In another comparison result, the similarity metric does not satisfy the threshold. For example, the value of the CMAE between the target and reference acoustic fingerprints may be greater than the threshold.

Once acoustic fingerprinting method 400 has determined whether or not the similarity metric satisfies the threshold, decision block 420 then completes. In response to the first comparison result, acoustic fingerprinting method 400 continues at process block 425. In response to the second comparison result, acoustic fingerprinting method 400 continues at process block 430. At the completion of decision block 420, acoustic fingerprinting method 400 has determined whether or not the target acoustic fingerprint is sufficiently like the reference acoustic fingerprint to be considered a match. Or at the completion of decision block 420, acoustic fingerprinting method 400 has determined whether or not the target acoustic fingerprint is sufficiently dissimilar to the reference acoustic fingerprint to indicate that the target vehicle is disguised as the type of the reference vehicle.

At process block 425, in response to a first comparison result (of the comparing of the similarity metric to the threshold) where the similarity metric satisfies the threshold, acoustic fingerprinting method 400 indicates that the target vehicle matches the reference vehicle. In one embodiment, the processor composes and sends an electronic message indicating that the target vehicle is a match to the reference vehicle. In one embodiment, the processor causes a graphical user interface to display information indicating that the target vehicle is a match to the reference vehicle. Process block 425 then completes, and acoustic fingerprinting method 400 continues to END block 435, where method 400 completes.

At process block 430, in response to a second comparison result (of the comparing of the similarity metric to the threshold) where the similarity metric does not satisfy the threshold, acoustic fingerprinting method 400 indicates that the target vehicle does not the reference vehicle. In one embodiment, the processor composes and sends an electronic message indicating that the target vehicle is not a match to the reference vehicle. In one embodiment, the processor causes a graphical user interface to display information indicating that the target vehicle does not match the reference vehicle. Process block 425 then completes, and acoustic fingerprinting method 400 continues to END block 435, where method 400 completes.

In one embodiment, as discussed in further detail elsewhere herein, the target vehicle is either found to be the reference vehicle itself, or found not to be the reference vehicle, based on the comparison of the similarity metric and threshold. Thus, in one embodiment, in response to a comparison result that indicates finding the match, the processor indicates that the target vehicle is the reference vehicle. And, in one embodiment, in response to a comparison result that indicates not finding the match, the processor indicates that the target vehicle is not the reference vehicle.

In one embodiment, as discussed in further detail elsewhere herein, the target vehicle is either found to be of a same type as the reference vehicle, or found not to be of a same type as the reference vehicle (and therefore to be disguised as the type of the reference vehicle), based on the comparison of the similarity metric and threshold. Thus, in one embodiment, in response to a comparison result that indicates finding the match, the processor indicates that the target vehicle is a same type of vehicle as the reference vehicle. And, in one embodiment, in response to a comparison result that indicates not finding the match, the processor indicates that the target vehicle is a different type of vehicle from the reference vehicle. In one embodiment, in response to a comparison result that indicates not finding the match, the processor further indicates that the target vehicle is disguised as the type of the reference vehicle.

In one embodiment, as discussed in further detail elsewhere herein, acoustic fingerprints are generated for target vehicles or reference vehicles. In one embodiment, to generate an acoustic fingerprint, acoustic output of a vehicle is measured. In one embodiment, a spectrum of the measurements is decomposed into a set of frequencies. In one embodiment, the set of frequencies is partitioned into bins covering ranges of the set of frequencies. A set of one or more bins is selected to be a basis of the acoustic fingerprint. Representative frequencies of the set of bins are selected as component frequencies are sampled at intervals over a period of time to produce a set of component time series signals. In one embodiment, the set of component time series signals for both the reference acoustic fingerprint and the target acoustic fingerprint are sampled from one set of component frequencies that are the same for the reference acoustic fingerprint and the target acoustic fingerprint. The one set of component frequencies are those frequencies that are most informative about operation of the reference vehicle, as discussed elsewhere herein. Where the vehicle is the target vehicle, the target acoustic fingerprint is generated from the set of component time series signals sampled from the acoustic output of the target vehicle at the one set of component frequencies. Where the vehicle is the reference vehicle, the reference acoustic fingerprint is generated from the set of component time series signals sampled from the acoustic output of the reference vehicle at the one set of component frequencies. In one embodiment, ambient noise in the component time series signals is compensated for based on values for the component time series signals predicted by a machine learning algorithm.

In one embodiment, as discussed in further detail elsewhere herein, similarity metrics are generated from differences between component signals of a target acoustic fingerprint and corresponding component signals in a reference acoustic fingerprint. In one embodiment, to generate the similarity metric, the processor finds a mean absolute error between a component signal of a target acoustic fingerprint and a corresponding component signal of the reference acoustic fingerprint. In one embodiment, this mean absolute error detection may be repeated for a set of one or more target component signals included in the target acoustic fingerprint. Once the mean absolute errors are found for the target component signals in the set, the processor finds a sum of the mean absolute errors. In one embodiment, the similarity metric is the sum of the mean absolute errors. The sum of the mean absolute errors may be referred to as the cumulative mean absolute error (CMAE).

—Example Generation of Acoustic Fingerprint—

Figure 5:
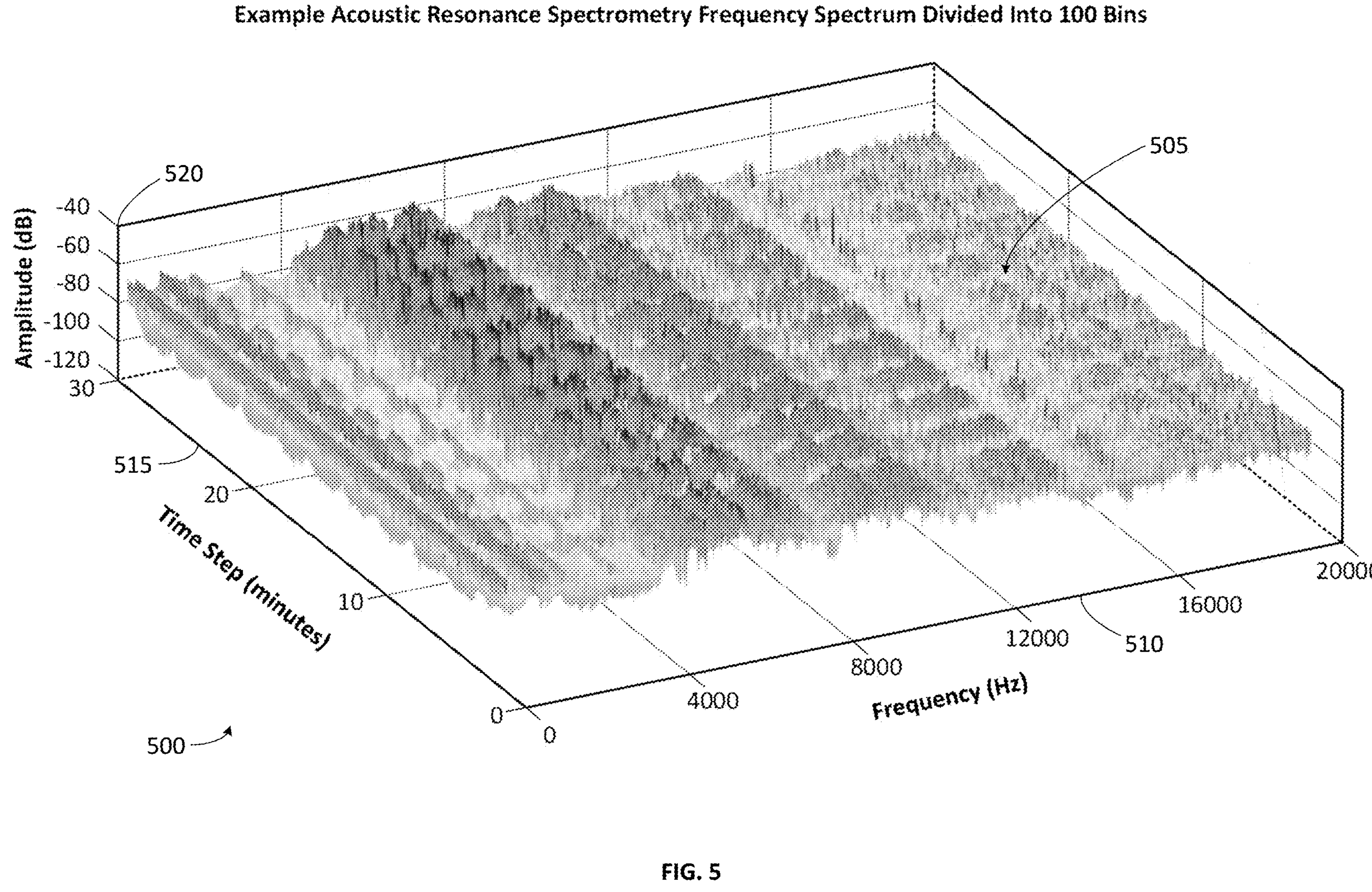
FIG. 5 illustrates an example waveform plotted against three axes of example measurements that were obtained from acoustic sensors monitoring a target vehicle.

In one embodiment, to generate an acoustic fingerprint from acoustic output of a vehicle, the acoustic output of a vehicle is first detected, sensed, or measured. In one embodiment, this detection, sensing, or measurement may be performed by acoustic transducers and a spectrum analyzer. FIG. 5 illustrates an example waveform 500 plotted against three axes of example measurements 505 that were obtained from acoustic sensors monitoring a target vehicle (in this example, a boat). The frequency is on the x-axis 510, time on the y-axis 515, and the acoustic power amplitude on the z-axis 520. Example measurements 505 shows how the acoustic output (or response, measured in power on z-axis 520) at each frequency changes over time. In one embodiment, the frequency domain waveforms over the spectrum of frequencies are sampled at a high sampling rate, such as 20 kHz.

In one embodiment, the acoustic output is initially characterized in the frequency domain. In one embodiment, the acoustic output is a continuous frequency waveform spectrum output by acoustic transducers. For example, the acoustic output detected by the acoustic transducers may be a sequence sampled at time intervals of frequency-domain waveforms over the spectrum of frequencies. The acoustic fingerprinting system then effects a frequency-domain to time-domain transformation to turn the acoustic waveforms into time series signals of operational signatures to be used as components to create an acoustic fingerprint.

As an initial step of the frequency-domain to time-domain transformation, the spectrum of frequency-domain measurements over time is then decomposed into a set of raw frequencies. In one embodiment, the set of frequencies includes a frequency at intervals along the frequency spectrum. In one embodiment, the frequencies are at intervals of the raw (fine frequency resolution) output by the spectrum analyzer, or coarser intervals.

In one embodiment, as a next step of the frequency-domain to time-domain transformation, the set of frequencies is then partitioned into bins covering ranges of the set of frequencies. In one embodiment, the frequency bins are contiguous ranges of the frequency spectrum. In one embodiment, the frequency bins are discrete and do not overlap. In one embodiment, the frequency bins partition the fine frequencies generated by the spectrum analyzer into the ranges. In one embodiment, the frequency bins are of approximately equal width, covering similar ranges of the frequency spectrum.

In one embodiment, a frequency bin is represented by one component frequency within the frequency bin. This component frequency may be referred to as the representative frequency for the bin. In one embodiment, the representative frequency is a frequency on which the bin is centered, at a mid-point of the range covered by the bin. In one embodiment, the representative frequency is a frequency among those within the bin that has highest peaks or that has greatest changes in amplitude. In one embodiment, the representative frequency is an aggregate frequency, such as an average (mean or median) of fine frequency values across the frequency range of the frequency bin. In one embodiment, a discrete signal of acoustic amplitude over time is sampled from the representative frequency of a bin. This signal may be referred to as the representative signal for the frequency bin.

The frequency bins and their representative signals may be considered to be "coarse" because multiple raw frequencies are included in a frequency bin. For example, in one embodiment, the frequency spectrum may be divided into 100 bins (although higher or lower numbers of bins may be used). Thus, in an acoustic spectrum ranging from 20 Hz to 20,000 Hz, a frequency bin that is one one-hundredth (0.01) of the width of the spectrum is approximately 200 (199.8) Hz wide. Referring again to FIG. 5, the original acoustic waveform of example measurements 505 is shown binned into 100 independent bins.

In a further step of the frequency-domain to time-domain transformation, a set of one or more representative signals is selected to be a basis of the acoustic fingerprint. In one embodiment, the selection of these representative signals is performed automatically by the acoustic fingerprinting system. In one embodiment, the set of component signals selected for inclusion in the acoustic fingerprint are those that are most informative—that is, most information bearing—about the operation of the vehicle. In one embodiment, the most informative component frequencies that best characterize operation of the vehicle are automatically identified.

In one embodiment, the target acoustic fingerprint is specifically generated for the purpose of comparison with a specific reference fingerprint, and therefore includes samples of acoustic output of the target at frequency ranges also sampled for acoustic output of the reference vehicle. In one embodiment, where the acoustic fingerprint being created is a target acoustic fingerprint, the selected bins are those bins used to create the reference acoustic fingerprint that the target acoustic fingerprint is to be compared to. In this way, the target acoustic fingerprint includes content most informative for comparison with the reference acoustic fingerprint.

In one embodiment, the most informative representative signals may be autonomously extracted and ranked by the acoustic fingerprinting system based on a power spectral density (PSD) analysis of the representative signals. In one embodiment, a PSD curve is generated for each representative frequency. The PSD curve for a representative frequency may be calculated by performing a fast Fourier transform on the representative signal.

Peaks in the PSD curve are dominated by repetitive or cyclic output, such as motor/engine or other drive-train noise of the vehicle under acoustic surveillance. Thus, the motor, engine, drivetrain, or other cyclic noises made by operating the vehicle appear as peaks in the PSD curves. Those representative frequencies having the highest peaks in the PSD curve thus carry the most information about operation of the vehicle—sounds produced by operation of the vehicle—and are therefore the most informative.

In one embodiment, the bins are ranked by peak height of the PSD curves for the representative frequency of the bins. In one embodiment, the set of bins whose representative frequencies have the highest PSD peaks are automatically selected to be the basis of the acoustic fingerprint. In one embodiment, the top N bins are selected. N component time series signals for inclusion in the acoustic fingerprint will be sampled from these top N bins. In this way, the processor may autonomously extract and rank the most informative acoustic time-series signals from a database of measurements spanning a wide band of acoustic frequencies.

In one embodiment, N is 20. In one embodiment, N is between 1 and 20, inclusive. While N may be greater than 20, there may be diminishing returns of vehicle identification accuracy for increases in the number of component signals N in an acoustic fingerprint and associated increases in compute costs. In one embodiment, a value of approximately 20 for a number N of component signals in acoustic fingerprints strikes a good balance between identification accuracy and compute cost, with identification accuracy exceeding 95%. In one embodiment, the number of bins and resulting component signals may be adjusted to other values depending on the frequency ranges supported by the acoustic transducer and associated amplifier and processing hardware.

Representative frequencies for the set of N bins are sampled at an interval over a period of time to produce a set of component time series signals to be components of an acoustic fingerprint. Where the vehicle is the target vehicle, the target acoustic fingerprint is generated from the set of component time series signals. Where the vehicle is the reference vehicle, the reference acoustic fingerprint is generated from the set of component time series signals. In one embodiment, the sampling interval is modest, for example, with samples of amplitude values being taken at an interval of one second. Experiments have demonstrated selecting N to be 20 bins and reporting their-frequency dependent power metrics at a modest interval such as 1 second results in good identification performance at a modest compute cost.

In one embodiment, an acoustic fingerprint includes a set of N time series signals of values sampled at intervals derived from the N selected informative frequencies. These time series signals may be referred to as component signals of the acoustic fingerprint. In one embodiment, there are N component signals in the acoustic fingerprint, each of which is sampled from a different one of the selected bins (that is, sampled from the representative frequency of the bin). For example, in one embodiment, an acoustic fingerprint is a data structure that includes the N component signals. At this point, the acoustic fingerprint has been generated, and may be used for comparisons.

Thus, in one embodiment, the reference acoustic fingerprint includes N component signals, and target acoustic fingerprint acoustic fingerprint includes N component signals. Thus, in one embodiment, the reference acoustic fingerprint and the target acoustic fingerprint have an equal number of component signals. In one embodiment, these signals correspond to each other. This correspondence is based on the sampled frequency for the component time series signal. For example, a first reference signal of the N component signals of the reference acoustic fingerprint is sampled from the reference acoustic output at a first frequency, and a first target signal of the N component signals of the target acoustic fingerprint is sampled from the target acoustic output also at the first frequency.

In one embodiment, the reference acoustic fingerprint (provided for generation of the similarity metric) is generated from measurements of acoustic output of the reference vehicle. For example, the reference acoustic fingerprint may be created from live acoustic output data, for example, prior to or concurrently with detection of acoustic output of the target vehicle and creation of the target fingerprint. In one embodiment, the reference vehicle is of unknown configuration. A created reference acoustic fingerprint may be stored in a library or database of acoustic fingerprints for subsequent retrieval or use.

In one embodiment, a user may be presented with an option to select whether the acoustic fingerprinting system is to generate a reference fingerprint or generate a target fingerprint, and in response to input selecting one option or the other, the acoustic fingerprinting system will execute the user-selected option.

In some situations, it is possible that the component time series signals contain superimposed ambient noise. Therefore, in one embodiment, after the creation of the component time series signals by sampling the selected most informative bins, the acoustic fingerprinting system may perform an ambient compensation technique. The ambient compensation technique detects and corrects for superimposed ambient noise. In one embodiment, a first portion of the values of each component time series signal are designated a training portion. The first portions are then used to train a multivariate machine learning algorithm (such as the multivariate state estimation technique) to predict the values of the component time series signals. A second portion of the values of each component time series signal are designated a surveillance portion. The trained multivariate ML algorithm consumes the surveillance portions of the component time series and predicts their values. In one embodiment, the predicted values for the component time series are recorded as a de-noised component time series. In one embodiment, one or more of the de-noised component time series are included in the acoustic fingerprint in place of the original component time series. This makes the acoustic fingerprinting technique more robust in high-noise areas (such as ports or harbors). The ambient compensation further reduces the chance of false-positive or false negative identifications by the acoustic fingerprinting system. In this way, the acoustic fingerprinting system may compensate for ambient noise in the component time series signals based on values for the component time series signals predicted by a machine learning algorithm.

—Example Similarity and Matching of Target and Reference Vehicles—

As mentioned above, the processor generates a similarity metric that quantifies similarity of the target acoustic fingerprint to a reference acoustic fingerprint. In one embodiment, the acoustic fingerprinting system 300 is configured to conduct a comparison test between acoustic fingerprints of vehicles in order to generate the similarity metric.

In one embodiment, the acoustic fingerprinting system utilizes the target and reference acoustic fingerprints to conduct a comparison test between acoustic operation signatures of vehicles. In one example procedure for the comparison, initially, one vehicle is chosen as the reference vehicle or "Golden System" (GS), and another vehicle is chosen as the target vehicle or "Unit Under Test" (UUT). The acoustic operation signatures of these vehicles are represented by their respective acoustic fingerprints. The acoustic fingerprint of the reference vehicle (or reference acoustic fingerprint) is compared to the acoustic fingerprint of the target vehicle (or target acoustic fingerprint).

In one embodiment, to compare the reference vehicle to the target vehicle, the acoustic fingerprinting system calculates the Mean Absolute Error (MAE) in a sequential one to one fashion. In one embodiment, the first component signal in the reference acoustic fingerprint is compared to the first component signal in the target acoustic fingerprint, and the second component signal in the reference acoustic fingerprint is compared to the second component signal in the target acoustic fingerprint, and so on through the correlated pairs of component signals. The resulting MAE values are then summed to distil the differences between the two signatures into a similarity metric called the Cumulative MAE (CMAE). In one embodiment, this process is repeated for any remaining target vehicles.

On a macro scale this process may assist in quantitatively differentiating between different types of vehicles, allowing for a passive determination as to whether a target vehicle is of the type that the vehicle appears to be, or whether the target vehicle is of another type and disguised as the type that the vehicle appears to be. To accomplish this, the target vehicle is compared to the reference vehicle. The CMAEs for vehicles of the same type will drop towards zero while vehicles of differing types (for example, an unmodified vehicle of a given make and model and a modified vehicle of the given make and model that is disguised to appear unmodified) will have large values and therefore indicate that the target vehicle is disguised as the same type as the reference vehicle. The CMAE similarity metric may also be used to identify records of prior surveillance of the target vehicle from a library of acoustic fingerprints.

As discussed above, in one embodiment, an acoustic fingerprint includes a set of N component time series signals (TSS) of values sampled at intervals from selected informative frequencies. In one embodiment, the component TSSs of acoustic fingerprints allow for comparison of one acoustic fingerprint to another in the time domain. For example, by comparing values of a component TSS in the acoustic fingerprint to values of a corresponding component TSS in another acoustic fingerprint, similarity (or difference) between the component TSSs may be quantified. This process of comparison to quantify similarity between corresponding TSSs in acoustic fingerprints may be repeated for remaining or additional corresponding pairs of component TSSs to quantify overall similarity between the acoustic fingerprints.

In one embodiment, the processor compares the values of component time series signals in the target acoustic fingerprint (also referred to herein as a target component TSS) with the values of corresponding component time series signals in the reference acoustic fingerprint (also referred to herein as a reference component TSS). In one embodiment, the reference acoustic fingerprint has reference component TSSs for a similar (or same) set of frequency bins as does the target acoustic fingerprint. Thus, in one embodiment, a target component TSS corresponds to a reference component TSS where they are both sampled from the similar frequency bins.

In one embodiment, values of the target component TSS are compared pairwise with the values of the corresponding reference component TSS. In one embodiment, an initial pair of values are selected, one value from the target component TSS and one from the reference component TSS. In one embodiment, the pair of values selected are the values occupying beginning (or end) positions of the target component TSS and reference component TSS. In one embodiment, other locations in the component TSS signals may be selected for comparison.

In one embodiment, the initial values are then compared to find an extent to which the values differ. For example, the values may be compared by finding an absolute value of the difference or absolute residual between them. This absolute value of the difference may also be referred to as an absolute error between the paired values. Additional pairs of values from the target and reference component TSSs are subsequently compared to find an absolute value of the difference between the pair. In one embodiment, each pair of values following the initial values of the component TSSs are compared in turn to find an absolute error between each pair.

In one embodiment, a subset of the pairs of values of the component TSS are compared to find an absolute error between each pair in the subset. For example, some pairs may be skipped, for example by comparing only value pairs appearing at an interval in the component TSSs.

In one embodiment, the processor calculates a mean of the absolute errors between the paired value of the corresponding target and reference component TSS to generate a mean absolute error (MAE) for these corresponding component TSSs. In one embodiment, the processor calculates a MAE between each corresponding pair of target and reference component TSSs of the target and reference acoustic fingerprints. Then, in one embodiment, the processor calculates a cumulative MAE (CMAE) between the target and reference acoustic fingerprints from the set of the MAEs between the component signals. In one embodiment, the processor calculates the CMAE by combining the MAEs, for example by adding up all the MAEs to find the sum of the MAEs. In one embodiment, the CMAE between the target and reference acoustic fingerprints is used as a similarity metric to quantify the similarity or likeness of the target and reference acoustic fingerprints.

In one embodiment, other similarity metrics may be substituted for the CMAE. In one embodiment, other similarity metrics that quantify similarity in the time domain of the corresponding component TSSs for target and reference acoustic fingerprints may be acceptable alternative similarity metrics to CMAE. For example, similarity metrics between target and reference acoustic fingerprints based on mean absolute scaled error, mean squared error, or root mean square error between the corresponding target and reference component TSSs may also perform acceptably.

In one embodiment, finding a match between target and reference acoustic fingerprints indicates that the target vehicle is of a same type as the reference vehicle. For example, the target vehicle may be of the same type as the reference vehicle where the target vehicle has the same structural and drive train configuration as the reference vehicle. As used herein, vehicles having a "same type" and being "of a type" allows for cosmetic variations such as paint and other changes that have little to no effect on the acoustic output of the vehicles.

In one embodiment, finding no match—an acoustic dissimilarity—between target and reference acoustic fingerprints indicates that, despite the target vehicle appearing to be of a same type as the reference vehicle, the target vehicle is not of the same type as the reference vehicle. For example, the target vehicle may have a structural and/or drive train configuration that differs from the structural and/or drive train configuration of the reference vehicle that the target vehicle appears to be. Because the target vehicle appears to be of the same type as the reference vehicle, but is acoustically dissimilar to the reference vehicle, the target vehicle is suspected to be disguised as the same type as the reference vehicle, rather than actually being of the same type as the reference vehicle.

—Passive Acoustic Surveillance—

In one embodiment, the acoustic output of the target vehicle is recorded passively, for example by one or more acoustic transducers. For example, in one embodiment, acoustic energy is not directed to the target vehicle by the acoustic fingerprinting system. Instead, energy collected from the target vehicle is generated by operation of the target vehicle (such as motor or engine noise) or generated by interaction of the target vehicle with its surroundings (such as sounds of a boat hull on water or tire noise on a road).

Advantageously, the passive nature of acoustic surveillance minimizes risk of the surveillance being detected. For example, passive recording of acoustic output does not alert operators of a target vehicle to the surveillance. This is in contrast to active surveillance activities such as RADAR, LIDAR, or SONAR, which respectively direct radio, laser, or sound energy towards the target vehicle. These active surveillance activities may be detected by operators of the target vehicle, who may then abort any illicit activity or attempt to flee the surveillance.

—Example Acoustic Transducers—

As used herein, an acoustic transducer refers to an apparatus that converts sound wave vibrations into electrical signals when exposed to the sound wave vibrations. For example, an acoustic transducer may be a microphone, hydrophone, or geophone as discussed in further detail herein. The electrical energy generated by the transducer from the sound wave vibrations may be amplified by an amplifier and/or recorded as a data structure in various media.

In one embodiment, the acoustic fingerprinting system includes one or more acoustic transducers for sensing or recording acoustic output of a vehicle. In one embodiment, acoustic output of the target vehicle is recorded using one or more acoustic transducers. In one embodiment, acoustic output of the reference vehicle is recorded using one or more acoustic transducers. Differences between a set of acoustic transducers used to record acoustic output of a target vehicle and a set of transducers used to record acoustic output of a reference vehicle may be corrected for by the acoustic fingerprinting system.

In one embodiment, the acoustic transducer may be a spherically isotropic transducer that receives sound wave vibrations from multiple directions. In one embodiment, the acoustic transducer may be a directional transducer that collimates incoming sound wave vibrations from a particular direction to the transducer through a shaped channel (such as through a round or rectangular tube). In one embodiment, the particular direction is a direction toward a target vehicle or reference vehicle. In one embodiment, the acoustic transducer may be a directional transducer that concentrates incoming sound wave vibrations from a particular direction to the transducer by reflecting the sound wave vibrations off of a reflecting inner surface such (such as off a parabolic surface or partial spherical surface). The concentrating directional transducer concentrates soundwaves impinging on a larger opening where the sound waves come in approximately parallel from a target source. In one embodiment, a directional transducer serves to exclude ambient noise from the sensed acoustic output of a target vehicle. Transducers with varying sensitivity based on direction may also be used.

In one embodiment, the acoustic fingerprinting system uses a plurality of (or multiple) transducers. For example, the plurality of transducers are independent directional microphones. The plurality of transducers is deployed with at least several inches of separation between the transducers. In one embodiment, the plurality of transducers includes two concentrating directional microphones. Employing two or more microphones deployed with several or more inches of separation permits continuous triangulation. The triangulation allows the system to estimate with fairly high accuracy the location of a vehicle under surveillance. This allows for more precise labeling of samples as belonging to a particular vehicle under surveillance. The triangulation also allows the system to infer a rate at which a vehicle is coming closer or going away. This allows for compensation for Doppler shifts in frequency in the acoustic output received by the system.

In one embodiment, the acoustic fingerprinting system uses just one transducer. Where just one transducer is used, the acoustic fingerprinting system compensates for Doppler shifts in frequency by sending a pulsed signal and inferring bounce-back time.

In one embodiment, an acoustic transducer may be an electromagnetic-acoustic transducer, such as a condenser transducer, a dynamic transducer, or a ribbon transducer. In a capacitance or condenser transducer, a diaphragm acts as one plate of a capacitor, in which the electrical signals are produced as electrical energy across the capacitor plates is changed when the sound wave vibrations displace the diaphragm. In a dynamic or moving-coil transducer, an induction coil is placed in a magnetic field, and the electrical signals are produced by induction as the induction coil is displaced within the magnetic field by the action of the sound wave vibrations (for example by action on a diaphragm attached to the induction coil). In a ribbon transducer, a conductive ribbon is suspended in a magnetic field, and the electrical signals are produced by induction as the ribbon is displaced within the magnetic field by the action of the sound wave vibrations.

In one example, the acoustic transducer may be a piezoelectric-acoustic transducer that generates electrical energy in proportion to the sound wave vibrations when a piezoelectric material is deformed by the sound wave vibrations. In one example, the acoustic transducer may be an optical-acoustic transducer that converts sound wave vibrations into electrical energy by sensing changes in light intensity, such as in a fiber-optic or laser microphone. Other acoustic transducers for generating electrical signals from sound wave vibrations may also be used in accordance with the acoustic fingerprinting systems and methods described herein.

—Acoustic Fingerprint Library—

In one embodiment, the reference acoustic fingerprint is retrieved from a library (or other data structure(s)) of acoustic fingerprints. The reference acoustic fingerprint is stored in the library in association with information describing the reference vehicle. In one embodiment, a library of acoustic fingerprints is populated and/or maintained by entities that acoustically surveil vehicles, such as government entities or vehicle manufacturers. For example, a government entity may acoustically surveil one or more vehicles of a given make and model, and generate (and add to the library) an acoustic fingerprint for those vehicles. These surveillance acoustic fingerprints may serve as reference fingerprints for the type (e.g., make and model or other configuration) of the surveilled vehicle, as well as a unique fingerprint of the particular surveilled vehicle. Or, for example, legitimate vehicle manufacturers will generate and supply to the library acoustic fingerprints for various makes and models of the manufacturer's vehicles.

In one embodiment, the library includes information describing individual fingerprinted vehicles, and/or information describing types of vehicle. The information associated with a reference acoustic fingerprint for a type of vehicle in the library may include descriptions of type such as make, model, configuration, or other physical properties of the vehicle. The information describing the reference vehicle may include operation parameters of the reference vehicle during collection of acoustic output to generate the reference fingerprint, such as throttle position or speed.

Information in addition to the description of the type may be stored in the library in association with the acoustic fingerprint of the individual vehicle. The information associated with the acoustic fingerprint of the individual vehicle in the library may include one or more times and locations at which the vehicle has been previously surveilled acoustically. For example, the library may include timestamped GPS coordinate, latitude and longitude, address, or other geolocation information in association with the acoustic fingerprint. The information describing the acoustic fingerprint of the individual vehicle in the library may include a unique identifier of the vehicle, such as a serial number, vehicle identification number, vehicle registration number, or other descriptor of a specific vehicle. The information describing the acoustic fingerprint of the individual vehicle in the library may include identification of persons or entities associated with the vehicle, such as an owner or operator of the vehicle. Some or all of the information associated with an acoustic fingerprint for an individual vehicle in the library may be displayed in the GUI in response to the test vehicle matching the acoustic fingerprint that is stored in the library.

Association between information in the library may include computer-readable relationship or connection between the acoustic fingerprint data and the data describing the reference vehicle, for example, sharing a row in a table, referencing keys of other tables, linking between data values, or other affiliation of data.

In one embodiment, where an acoustic fingerprint for a target vehicle is not in the library of acoustic fingerprints, for example during an initial surveillance or monitoring of the target vehicle, the acoustic fingerprint for the target vehicle may be stored in the library as a reference acoustic fingerprint. In one use case, where an acoustic fingerprint of a boat is not in the library of known acoustic fingerprints for known makes, models, or individual devices, the acoustic fingerprint is stored as a reference and used to positively identify the vessel when interdiction craft are able to stop the vessel.

Note that stochastic differences between vehicles of the same make and model is enough to uniquely identify the vehicle. Thus, in one embodiment, in the context of acoustic fingerprinting, finding a match between target and reference acoustic fingerprints indicates that the target vehicle is the reference vehicle. In other words, in one embodiment, the target vehicle and reference vehicle are a match when they are the same vehicle. And, the threshold level for finding a match may also be lowered so as to allow for stochastic differences between individual instances of a particular type of vehicle. Thus, in one embodiment, in the context of acoustic disguise detection, the finding a match between target and reference acoustic fingerprints indicates that the target vehicle is of a same type of vehicle as the reference vehicle. And, in one embodiment, in the context of acoustic disguise detection, the finding of no match between the target vehicle and a reference vehicle of a type of vehicle that the target vehicle appears to be indicates that the target vehicle is merely disguised to look like the type of the reference vehicle, and is not actually the same type as the reference vehicle.

—Example Implementations of Acoustic Disguise Detection—

As mentioned above, acoustic detection of disguised vehicles (and associated acoustic fingerprinting for acoustic identification of vehicles) finds one application in vehicle surveillance and interdiction. For example, the acoustic disguise detection systems and methods may be used to identify and track boats or other vehicles that are disguised to conceal involvement in illicit cargo distribution. In one embodiment, the acoustic fingerprinting systems and methods described herein may be used for passive surveillance of boats or other watercraft. Surveillance equipment such as acoustic transducers may be placed on shore for surveillance of watercraft in a harbor or port, or otherwise near a coastline. Surveillance equipment such as acoustic transducers may be placed on ships or otherwise in or on the water for surveillance of watercraft or aircraft at sea or offshore.

In one embodiment, groups of acoustic transducers deployed across multiple watercraft stretches of coastline and/or areas of water may be interconnected in order to provide multiple points of surveillance of watercraft. The interconnection may be by data networks between computing devices that collect acoustic information from the acoustic transducers. This allows watercraft or aircraft to be tracked as they move through a region. Further, where the acoustic transducers in the group have known locations, the location of disguised vehicles may be triangulated using the acoustic transducers.

Figure 6:
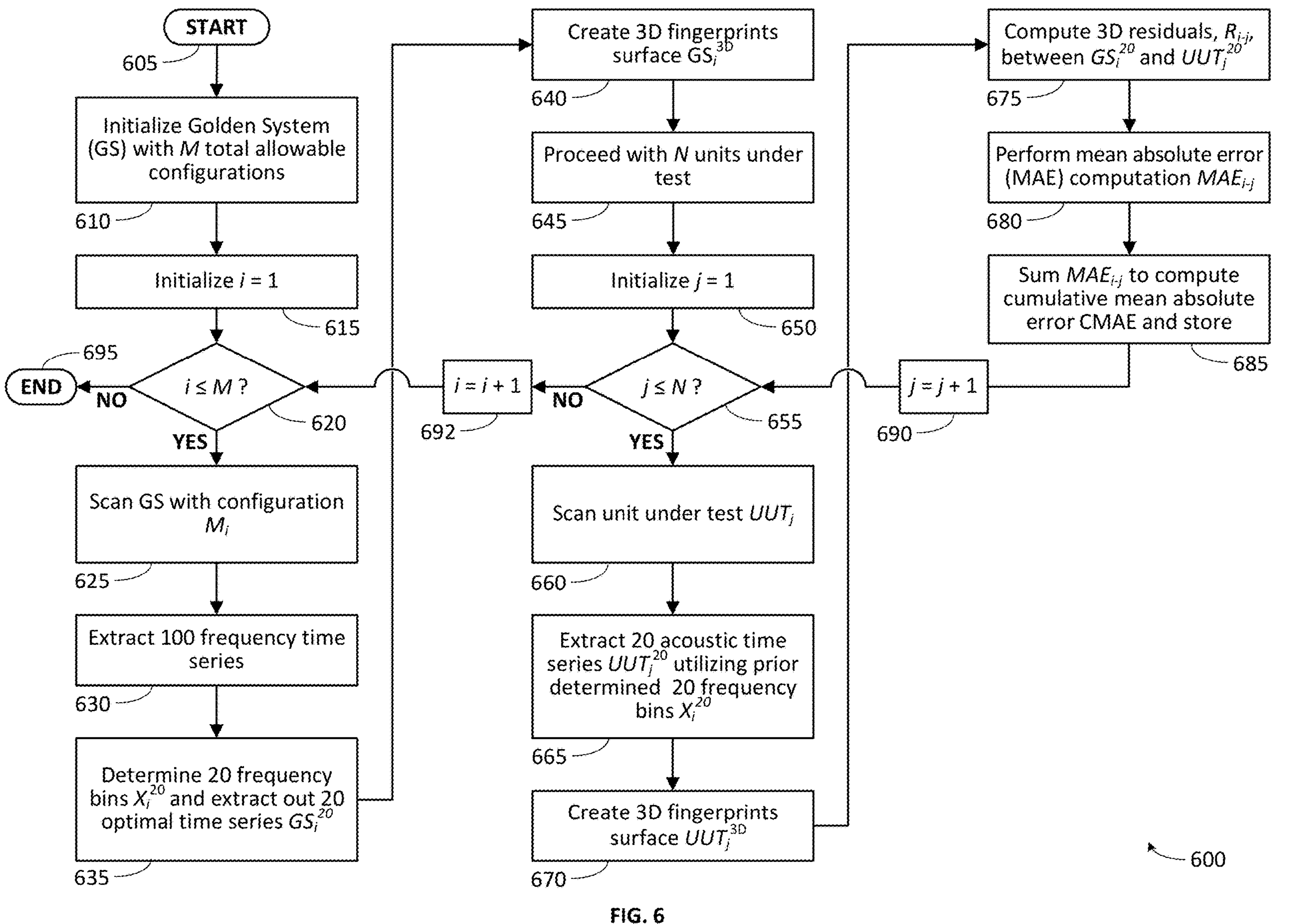
FIG. 6 illustrates one embodiment of an acoustic fingerprinting method 600 associated with acoustic identification of a target vehicle as matching or not matching a reference vehicle.

FIG. 6 illustrates one embodiment of an acoustic fingerprinting method 600 associated with acoustic identification of a target vehicle as matching or not matching a reference vehicle. In one embodiment, method 600 is one example of a CMAE-based comparison algorithm for differentiating vehicles. At a high level, a reference acoustic fingerprint is generated from acoustic output of a reference vehicle for one or more configurations of the reference vehicle, and then one or more target acoustic fingerprints are generated from acoustic output of target vehicle(s) and compared with the reference acoustic fingerprint(s).

In one embodiment, acoustic fingerprinting method 600 initiates at start block 605 in response to a processor (such as a processor of acoustic fingerprinting system 100) determining one or more of: (i) a computer configured as or as part of an acoustic fingerprinting system (such as system 100) has received or has begun receiving acoustic output of a reference vehicle; (ii) acoustic surveillance of a reference vehicle has commenced or has completed; (iii) a user (or administrator) of an acoustic fingerprinting system (such as system 100) has initiated method 600; or (iv) that method 600 should commence in response to occurrence of some other condition. Method 600 continues to process block 610.

At process block 610, the processor initializes the reference vehicle (also referred to as a golden system or GS) with a set of M total allowable configurations. In one embodiment, the allowable configurations of the reference vehicle include manufacturer variations of a particular make and model of vehicle. For example, where the vehicle is a boat, allowable configurations may include different motors, such as a 4-cylinder engine configuration, a 6-cylinder engine configuration, an 8-cylinder engine configuration, etc., with further variation for example based on fuel type such a diesel engine configurations and gasoline engine configurations. In one embodiment, the allowable configurations include those variations that affect operating noise, such as drivetrain options, and may exclude those variations that do not affect operating noise, such as paint color. In one embodiment, therefore, M may be a number of known variations in configuration of a make and model of reference vehicle.

At process block 615, the processor initiates a counter i for an outer loop that repeats for each of the M configurations. The outer loop is headed by decision block 620. At decision block 620, the processor determines whether the counter i is less than or equal to the number of configurations M. Where this condition is true (decision block 620: YES), the outer loop proceeds through an iteration, continuing at process block 625.

At process block 625, the processor scans the reference vehicle (GS) that has been placed in a configuration $M_i$. In one embodiment, the measurements of the acoustic output of the reference vehicle in the particular configuration are taken, for example as described in detail above. Processing then continues to process block 630.

At process block 630, the processor extracts one hundred (100) frequency time series from the measurements of the acoustic output of the reference vehicle (GS) in configuration $M_i$, for example as described in detail above. In one embodiment, the acoustic measurements are thus converted to a coarse set of bins (in this case, 100 bins). Processing then continues to process block 635.

At process block 635, the processor determines twenty (20) frequency bins $$X_i^{20}$$

and extracts out 20 time series $$GS_i^{20}$$

for the reference vehicle (GS) in configuration $M_i$, for example as described in detail above. In one embodiment, a smaller subset (in this case, 20 bins) of the frequencies are identified to be most informative, that is, the frequencies that are most useful and pertinent to inform about the make, model, type, or identity of the reference vehicle. In one embodiment, time series signals are extracted from the 20 bins that were identified as most informative, for example by sampling them at intervals, as described above. These time series signals will be used as component signals of acoustic fingerprints for the reference vehicle (GS) in configuration $M_i$. Processing then continues to process block 640.

At process block 640, the processor creates a three-dimensional fingerprints surface $$GS_i^{3D}$$

for the reference vehicle (GS) in configuration $M_i$. In one embodiment, the acoustic fingerprint for the reference vehicle (GS) in configuration $M_i$ is created from the component signals selected at process block 635. In one embodiment, the acoustic fingerprint for the reference vehicle (GS) in configuration $M_i$ is created as a three-dimensional surface in dimensions of frequency, time, and acoustic power amplitude. In one embodiment, the three-dimensional fingerprint surface $$GS_i^{3D}$$

combines the component signals, with the amplitude of each component signal extending over the range of its bin on the frequency axis. Processing then continues to process block 645.

At process block 645, the processor proceeds with a number N of target vehicles (also referred to as units under test (UUT)). In one embodiment, the number of target vehicles (UUTs) is counted. Processing then continues to process block 650, where the processor initiates a counter j for an inner loop that repeats for each of the N target vehicles (UUTs). The inner loop is headed by decision block 655. At decision block 655, the processor determines whether the counter j is less than or equal to the number of target vehicles (UUTs) N. Where this condition is true (decision block 655: YES), the inner loop proceeds through an iteration, continuing at process block 660.

In the inner loop, the measurements of acoustic output are repeated for one or more target systems. The component time series signals are sampled from the acoustic output of the target system at the same frequency bins determined for the reference system. This enables comparison of target and reference component TSSs one-to-one, at the same frequencies. With this one-to-one comparison between the selected frequencies, it becomes clear whether there is or is not a difference between a target component TSS and the reference component TSS.

At process block 660, the processor scans the target vehicle $UUT_j$. In one embodiments, the measurements of the acoustic output of target vehicle $UUT_j$ are taken, for example as described in detail above. Processing then continues to process block 665.

At process block 665, the processor extracts twenty (20) acoustic time series $$UUT_j^{20}$$

utilizing the prior-determined twenty frequency bins $$X_i^{20}$$

from the acoustic output of the target vehicle $UUT_j$. The prior determined bins $$X_i^{20}$$

are those bins or ranges of frequency determined or selected when the reference vehicle (GS) in configuration $M_i$ was scanned. In one embodiment, the processor extracts the component TSS $$(UUT_j^{20})$$

for the twenty bins by sampling the representative frequencies of these bins at intervals, for example as described in detail above. Thus, in one embodiment, the bins $$X_i^{20}$$

are sampled from the acoustic output of the reference vehicle to generate component signals for the reference vehicle fingerprint (for example as described above with reference to process block 635), and then the bins $$X_i^{20}$$

are sampled again from acoustic output of the target vehicle to generate component signals for the target vehicle fingerprint. Processing then continues to process block 670.

At process block 670, the processor creates a three-dimensional fingerprints surface $$UUT_j^{3D}$$

for the target vehicle $UUT_j$. In one embodiment, the acoustic fingerprint for the target vehicle is created from the component signals extracted at process block 665. When plotted together in dimensions of frequency, time, and acoustic power amplitude, the component signals of the acoustic fingerprint for the target vehicle $UUT_j$ form a three-dimensional fingerprints surface $$UUT_j^{3D}.$$

Processing then continues to process block 675.

At process block 675, the processor computes three-dimensional residuals $R_{i\text{-}j}$ between component time series signals $$GS_i^{20}$$

for the reference acoustic fingerprint and component time series signals $$UUT_j^{20}$$

for the target acoustic fingerprint. In one embodiment, the processor compares the corresponding time series signals to find the difference or residuals between the corresponding pairs of target and reference component signals, for example as described in detail above. When the computing of residuals is repeated for each pair of target and reference component signals, the three-dimensional residuals $R_{i\text{-}j}$ are computed between $$UUT_j^{3D}$$

and $$GS_i^{3D}.$$

Processing then continues to process block 680.

At process block 680, the processor performs a mean absolute error (MAE) computation to produce mean absolute errors $MAE_{i\text{-}j}$ on the three-dimensional residuals $R_{i\text{-}j}$. In one embodiment, the MAE values between the corresponding reference and target component time series signals for each frequency are determined, for example as described in detail above. In this example, where there are 20 frequencies, the processor finds the MAE value between the corresponding component time series signals for each of those bins, resulting in 20 MAE values $MAE_{i\text{-}j}$. Processing then continues to process block 685.

At process block 685, the processor sums the mean absolute errors $MAE_{i\text{-}j}$ to compute the cumulative mean absolute error (CMAE), and stores the CMAE for subsequent use. In one embodiment, the CMAE is used as a similarity metric to determine whether or not target vehicle $UUT_j$ is a match to reference vehicle GS in configuration $M_i$, for example as described in further detail above. Processing then continues to process block 690.

At process block 690, counter j for the inner loop is incremented j=j+1, and processing returns to decision block 655 to determine whether or not the inner loop is to be repeated for another iteration, for another target vehicle. In response to the determination at decision block 655 that the inner loop is not to be repeated for another iteration (decision block 655: NO), processing continues to process block 692, where counter i for the outer loop is incremented i=i+1. Processing then returns to decision block 620 to determine whether or not the outer loop is to be repeated for another iteration, for another configuration of the reference vehicle. In response to the determination at decision block 620 that the outer loop is not to be repeated for another iteration (decision block 620: NO), processing continues to END block 695, where method 600 completes.

At the conclusion of method 600, CMAE similarity metrics have been created for each comparison of the M configurations of the reference vehicle with the N target vehicles. These similarity metrics may be compared to a threshold, as described in detail above to determine whether any of the N target vehicles match any of the M configurations of the reference vehicle.

—Example GUI for Acoustic Disguise Detection—

Figure 7:
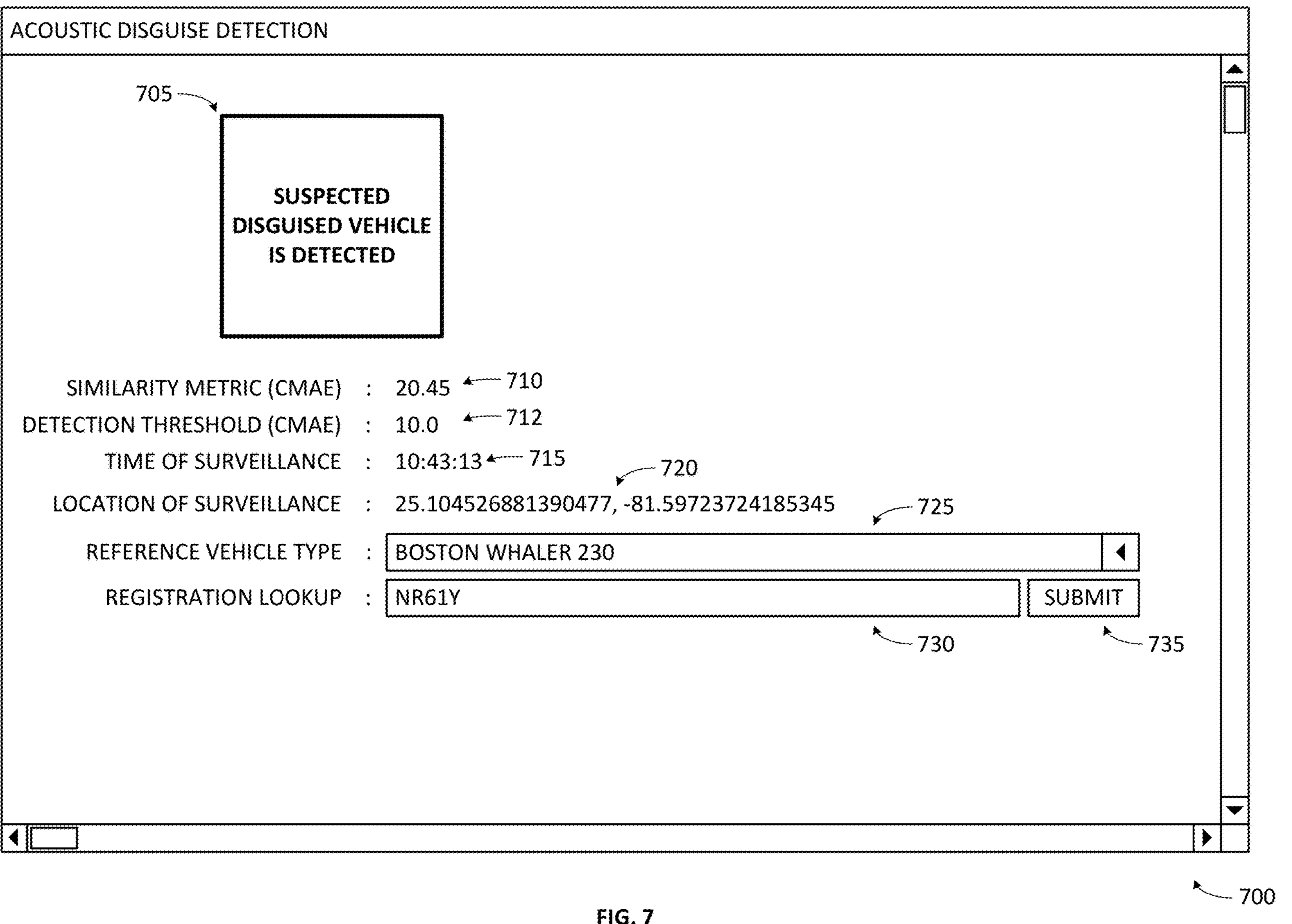
FIG. 7 illustrates an example GUI for alerting a user to detection of a potentially disguised vehicle associated with acoustic detection of vehicles that are modified to carry illicit cargo while disguised to appear unmodified.

The results of the acoustic disguise detection described herein may be presented in a graphical user interface (GUI). FIG. 7 illustrates an example GUI 700 for alerting a user to detection of a potentially disguised vehicle associated with acoustic detection of vehicles that are modified to carry illicit cargo while disguised to appear unmodified. Example GUI 700 displays information about whether or not an example watercraft (vessel) or other vehicle has been detected as disguised (or not).

In one embodiment, example GUI 700 includes an alert indicator 705 for displaying the status of the electronic alert. In one embodiment, a similarity metric (such as measure of acoustic similarity 710) in excess of a threshold amount, as discussed above, will trigger an electronic alert. The electronic alert will cause alert indicator 705 to be displayed in response to acoustic detection of a (potentially) disguised vehicle. Alert indicator 705 may state that a disguised vehicle (or a suspected disguised vehicle) has been detected. In one embodiment, alert indicator 705 may be configured as a shape such as a square or octagon with a color that attracts attention of a user, such as red. Alert indicator 705 may prompt the user to initiate further investigation of the target vessel, for example when the target vessel returns to dock, or by interdicting the target vessel. In one embodiment, alert indicator 705 will disappear and/or not be shown when no electronic alert is triggered by acoustic output from the target vehicle, indicating that the target vehicle is not disguised. In one embodiment, alert indicator 705 will be substituted with a no-alert indicator (not shown) where no disguised vehicle has been detected acoustically. For example, no-alert indicator may indicate that the vehicle matches the reference type and/or that no disguise has been acoustically detected.

In one embodiment, example GUI 700 includes a measure of the acoustic similarity 710. In one embodiment, measure of the acoustic similarity 710 is a similarity metric such as a CMAE, as discussed in detail above. In one embodiment, example GUI 700 includes a detection threshold value 712. Detection threshold value 712 indicates a threshold similarity metric value for acoustically determining that a disguised vehicle is detected. In one embodiment, measure of the acoustic similarity 710 in conjunction with detection threshold 712 provides underlying explanation of the basis for the alert determination displayed by alert indicator 705.

In one embodiment, example GUI 700 includes a time of surveillance 715. In one embodiment, time of surveillance 715 is a time at which surveillance of the target vehicle was performed. For example, time of surveillance may be a time at which surveillance of the target vehicle to obtain the target (first) acoustic output was initiated. Time of surveillance 715 may be displayed in example GUI 700 and also stored for future reference.

In one embodiment, example GUI 700 includes a location of surveillance 720. In one embodiment, location of surveillance 720 is a location of the vessel at the time at which the cargo mass change occurred. In one embodiment, location of surveillance 720 may be derived from triangulation from multiple surveillance locations, such as based on known positions of multiple acoustic transducers used to surveil the target vehicle. In one embodiment, location of surveillance 720 may be displayed on example GUI 700 and also stored for future reference.

In one embodiment, example GUI 700 includes a user-selectable input for type of reference vehicle 725. As discussed above, in one embodiment, acoustic disguise detection system may search for reference (second) acoustic output in a library based on an apparent type of the target vehicle. In one embodiment, user-selectable input for type of reference vehicle 725 takes the form of a drop-down menu for selecting from the types of reference vehicles that are present in the library, although other input mechanisms may be used. In one embodiment, in response to a user entering a type of reference vehicle that the user has observed the target vehicle to be into the user-selectable input for type of reference vehicle 725, acoustic disguise detection system 100 automatically retrieves the second (reference) acoustic output from the library and acoustically detects whether the target vehicle is not of the entered vehicle type. Example GUI 700 then displays a resulting measure of the acoustic similarity 710 and status 705 of the electronic alert.

In one embodiment, example GUI 700 includes a user-editable input for a registration number of the target vehicle 730. As discussed above, in one embodiment, acoustic disguise detection system may search for reference acoustic output in a library based on based on a vehicle type recorded for a registration number of the target vehicle. In one embodiment, user-editable input for a registration number of the target vehicle 730 takes the form of an editable field or text box, although other input mechanisms may be used. In one embodiment, in response to a user submitting (for example by selecting submit button 735) a vehicle registration number observed on the target vehicle into user-editable input for a registration number of the target vehicle 730, acoustic disguise detection system 100 automatically looks up the registered type of the target vehicle in a vehicle registration database; retrieves the second (reference) acoustic output for the registered type of the target vehicle from the library; and acoustically detects whether the target vehicle is not of the registered vehicle type. Example GUI 700 then displays a resulting measure of the acoustic similarity 710 and status 705 of the electronic alert.

In one embodiment, where the vehicle is a boat, the vehicle registration number is a U.S. Coast Guard (USCG) documentation number displayed on a USCG documentation number placard of the boat or state boat registration number displayed on the boat. In one embodiment, where the vehicle is a land craft or motor vehicle, the vehicle registration number is a motor vehicle license plate number. In one embodiment, where the vehicle is an aircraft, the vehicle registration number is an aircraft registration number displayed on the aircraft.

—Cloud or Enterprise Embodiments—

In one embodiment, the acoustic disguise detection system 100 is a computing/data processing system including an application or collection of distributed applications for enterprise organizations. The applications and acoustic disguise detection system 100 may be configured to operate with or be implemented as a cloud-based networking system, an infrastructure-as-a-service (IAAS), platform-as-a-service (PAAS), or software-as-a-service (SAAS) architecture, or other type of networked computing solution. In one embodiment the acoustic fingerprinting system is a centralized server-side application that provides at least the functions disclosed herein and that is accessed by many users via computing devices/terminals communicating with acoustic disguise detection system 100 (functioning as the server) over a computer network.

In one embodiment, one or more of the components described herein may intercommunicate by electronic messages or signals. These electronic messages or signals may be configured as calls to functions or procedures that access the features or data of the component, such as for example application programming interface (API) calls. In one embodiment, these electronic messages or signals are sent between hosts in a format compatible with transmission control protocol/Internet protocol (TCP/IP) or other computer networking protocol. In one embodiment, components may (i) generate or compose an electronic message or signal to issue a command or request to another component, (ii) transmit the message or signal to other components, and (iii) parse the content of an electronic message or signal received to identify commands or requests that the component can perform, and in response to identifying the command, the component will automatically perform the command or request.

—Software Module Embodiments—

In one embodiment, one or more of the components described herein are configured as program modules stored in a non-transitory computer readable medium. The program modules are configured with stored instructions that when executed by at least a processor cause the computing device to perform the corresponding function(s) as described herein.

In general, software instructions are designed to be executed by one or more suitably programmed processors accessing memory. These software instructions may include, for example, computer-executable code and source code that may be compiled into computer-executable code. These software instructions may also include instructions written in an interpreted programming language, such as a scripting language.

Such instructions may be arranged into program modules with each such module performing a specific task, process, function, or operation. The entire set of modules may be controlled or coordinated in their operation by an operating system (OS) or other form of organizational platform.

—Computing Device Embodiment—

Figure 8:
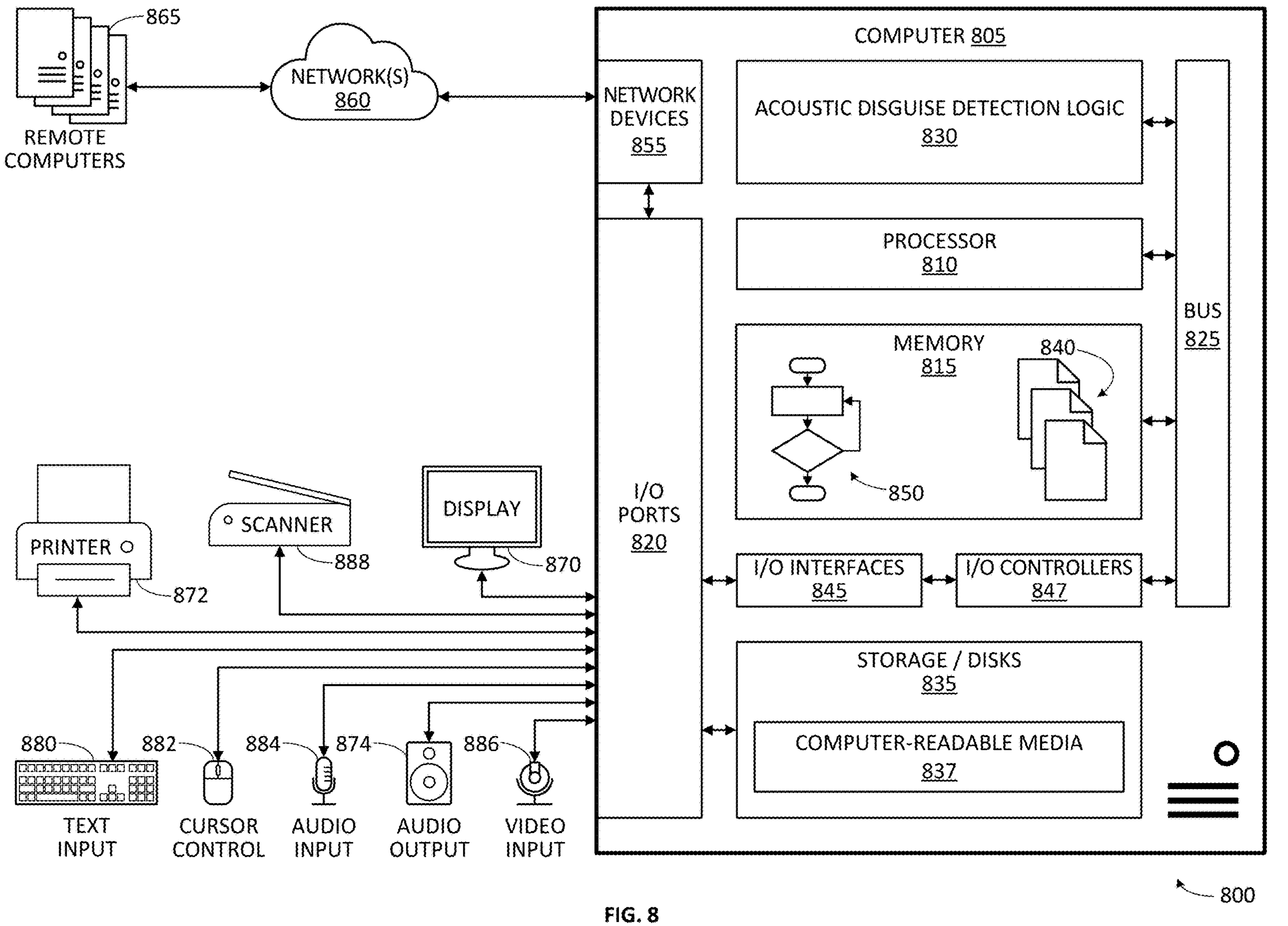
FIG. 8 illustrates an embodiment of a computing system configured with the example systems and/or methods disclosed.

FIG. 8 illustrates an example computing device 800 that is configured and/or programmed as a special purpose computing device with one or more of the example systems and methods described herein, and/or equivalents. The example computing device may be a computer 805 that includes at least one hardware processor 810, a memory 815, and input/output ports 820 operably connected by a bus 825. In one example, the computer 805 may include acoustic disguise detection logic 830 configured to facilitate acoustic detection of vehicles that are modified to carry illicit cargo while disguised to appear unmodified, similar to logic, systems, and methods shown and described herein for example with reference to FIGS. 1-7.

In different examples, acoustic disguise detection logic 830 may be implemented in hardware, a non-transitory computer-readable medium 837 with stored instructions, firmware, and/or combinations thereof. While the logic 830 is illustrated as a hardware component attached to the bus 825, it is to be appreciated that in other embodiments, acoustic disguise detection logic 830 could be implemented in the processor 810, stored in memory 815, or stored in disk 835.

In one embodiment, acoustic disguise detection logic 830 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to facilitate acoustic detection of vehicles that are modified to carry illicit cargo while disguised to appear unmodified. The means may also be implemented as stored computer executable instructions that are presented to computer 805 as data 840 that are temporarily stored in memory 815 and then executed by processor 810.

Acoustic disguise detection logic 830 may also provide means (e.g., hardware, non-transitory computer-readable medium that stores executable instructions, firmware) for performing acoustic detection of vehicles that are modified to carry illicit cargo while disguised to appear unmodified.

Generally describing an example configuration of the computer 805, the processor 810 may be a variety of various processors including dual microprocessor and other multi-processor or multi-core architectures. A memory 815 may include volatile memory and/or non-volatile memory. Non-volatile memory may include, for example, ROM, PROM, and so on. Volatile memory may include, for example, RAM, SRAM, DRAM, and so on.

A storage disk 835 may be operably connected to the computer 805 via, for example, an input/output (I/O) interface (e.g., card, device) 845 and an input/output port 820 that are controlled by at least an input/output (I/O) controller 847. The disk 835 may be, for example, a magnetic disk drive, a solid-state disk drive, a floppy disk drive, a tape drive, a Zip drive, a flash memory card, a memory stick, and so on. Furthermore, the disk 835 may be a CD-ROM drive, a CD-R drive, a CD-RW drive, a DVD ROM, and so on. The memory 815 can store a process 850 and/or data 840, for example. The disk 835 and/or the memory 815 can store an operating system that controls and allocates resources of the computer 805.

In one embodiment, non-transitory computer-readable medium 837 includes computer-executable instructions such as software. In general computer-executable instructions are designed to be executed by one or more processors 810 accessing memory 815 or other components of computer 805. These computer-executable instructions may include, for example, computer-executable code and source code that may be compiled into computer-executable code or interpreted for execution.

The computer 805 may interact with, control, and/or be controlled by input/output (I/O) devices via the input/output (I/O) controller 847, the I/O interfaces 845, and the input/output ports 820. Input/output devices may include, for example, one or more displays 870, printers 872 (such as inkjet, laser, or 3D printers), audio output devices 874 (such as speakers or headphones), text input devices 880 (such as keyboards), cursor control devices 882 for pointing and selection inputs (such as mice, trackballs, touch screens, joysticks, pointing sticks, electronic styluses, electronic pen tablets), audio input devices 884 (such as acoustic transducers as described in detail above, or external audio players), video input devices 886 (such as video and still cameras, or external video players), image scanners 888, video cards (not shown), disks 835, network devices 855, and so on. The input/output ports 820 may include, for example, serial ports, parallel ports, and USB ports.

The computer 805 can operate in a network environment and thus may be connected to the network devices 855 via the I/O interfaces 845, and/or the I/O ports 820. Through the network devices 855, the computer 805 may interact with a network 860. Through the network, the computer 805 may be logically connected to remote computers 865. Networks with which the computer 805 may interact include, but are not limited to, a LAN, a WAN, and other networks.

In one embodiment, computer 805 may be configured with hardware to process heavy workloads (such as those involved in acoustic detection disguised vehicles based on fine-frequency acoustic output) at high speed with high reliability. For example, computer 805 may be configured to have high processing throughput and/or large memory or storage capacity. In one embodiment, computer 805 is configured to execute cloud-scale applications locally where network access is limited.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A method comprising:

recording a first acoustic output of a target vehicle;

accepting, as input, a vehicle type representing at least a make and model of the target vehicle;

retrieving, from a database, a second acoustic output of a reference vehicle that is assigned to the vehicle type;

acoustically detecting that the target vehicle has different characteristics than the reference vehicle based at least on an acoustic dissimilarity between the first acoustic output and the second acoustic output; and wherein the acoustic dissimilarity is determined by:

generating a target acoustic fingerprint from the first acoustic output;

generating a reference acoustic fingerprint from the second acoustic output; and computing a cumulative mean absolute error between the target acoustic fingerprint and the reference acoustic fingerprint, wherein the cumulative mean absolute error represents the acoustic dissimilarity; and generating an electronic alert that the target vehicle is potentially disguised as the vehicle type based on the acoustic dissimilarity.

2. The method of claim 1, wherein recording the first acoustic output further comprises:

collecting engine noise that is produced by operation of an engine of the target vehicle, wherein the first acoustic output includes the engine noise; and storing the engine noise as one or more time series.

3. The method of claim 1, further comprising passively recording the first acoustic output with one or more acoustic transducers that are located remotely from the target vehicle.

4. The method of claim 1, wherein acoustically detecting that the target vehicle has different characteristics than the vehicle type includes the target vehicle being a modified version of the reference vehicle.

5. The method of claim 1, further comprising generating a graphical user interface that includes a status of the electronic alert and a measure of the acoustic dissimilarity.

6. The method of claim 1, further comprising:

generating a target acoustic fingerprint from the first acoustic output; and wherein acoustically detecting that the target vehicle has different characteristics than the reference vehicle comprises:

detecting that the target vehicle has different audio characteristics than the reference vehicle based on at least mean absolute errors between the target acoustic fingerprint and a reference acoustic fingerprint generated from the second acoustic output of the reference vehicle.

7. A non-transitory computer-readable medium storing computer-executable instructions that when executed by at least a processor of a computer system cause the computer system to:

record a target acoustic output of a target vehicle, wherein the target vehicle includes a vehicle type representing at least a make and model;

generate a target acoustic fingerprint from the target acoustic output;

retrieve, from a database, a reference acoustic fingerprint of a reference vehicle that is assigned to the vehicle type;

acoustically detect whether the target vehicle matches the reference vehicle within a threshold based at least on an acoustic similarity between the target acoustic fingerprint and the reference acoustic fingerprint;

compute a cumulative mean absolute error between the target acoustic fingerprint and the reference acoustic fingerprint, wherein the cumulative mean absolute error represents the acoustic similarity; and generate an electronic alert that the target vehicle is or is not similar to the reference vehicle based on the acoustic similarity to the reference acoustic fingerprint.

8. The non-transitory computer-readable medium of claim 7, wherein the instructions to record the target acoustic output further cause the computer system to:

collect engine noise that is produced by operation of an engine of the target vehicle, wherein the target acoustic output includes the engine noise; and store the engine noise as one or more time series.

9. The non-transitory computer-readable medium of claim 7, wherein the instructions to generate the electronic alert further comprise instructions to cause the computer system to:

generate the electronic alert to indicate that the target vehicle has different characteristics than the reference vehicle and the target vehicle is potentially disguised to have an appearance of the vehicle type.

10. The non-transitory computer-readable medium of claim 7, wherein the instructions further cause the computer system to search a library for the reference acoustic fingerprint that is associated with the vehicle type.

11. The non-transitory computer-readable medium of claim 7, wherein the instructions further cause the computer system to generate a graphical user interface that includes a status of the electronic alert.

12. The non-transitory computer-readable medium of claim 7, wherein the instructions to retrieve the reference acoustic fingerprint further cause the computer system to:

accept a user input indicating the vehicle type of the target vehicle; and retrieving the reference acoustic fingerprint assigned to the vehicle type in a library of acoustic outputs from the database.

13. A computing system comprising:

a processor;

a memory operably connected to the processor;

a non-transitory computer-readable medium operably connected to the processor and memory and storing computer-executable instructions that when executed by at least the processor cause the computing system to:

record a first acoustic output of a target vehicle, wherein the target vehicle includes a vehicle type representing at least a make and model;

generate a first acoustic fingerprint from the first acoustic output;

retrieve, from a database, a second acoustic fingerprint of a reference vehicle associated to the vehicle type;

wherein the second acoustic fingerprint is generated from a second acoustic output recorded from the reference vehicle;

acoustically detect that the target vehicle has different audio characteristics than the reference vehicle based at least on an acoustic dissimilarity between the first acoustic fingerprint and the second acoustic fingerprint;

compute a cumulative mean absolute error between the first acoustic fingerprint and the second acoustic fingerprint, wherein the cumulative mean absolute error represents the acoustic dissimilarity; and generate an electronic alert that the target vehicle is a modified version of the reference vehicle based on the acoustic dissimilarity.

14. The computing system of claim 13, wherein the instructions to record the first acoustic output further cause the computing system to:

collect engine noise that is produced by operation of an engine of the target vehicle; and store the engine noise as part of the first acoustic output.

15. The computing system of claim 13, wherein the instructions further cause the computing system to passively record the first acoustic output with one or more acoustic transducers that are located remotely from the target vehicle.

16. The computing system of claim 13, wherein the target vehicle is a watercraft or an aircraft.

17. The computing system of claim 13, wherein the instructions further cause the computing system to generate a graphical user interface that includes a status of the electronic alert.

* * * * *